United States Patent
Flavell et al.

(10) Patent No.: US 7,714,873 B2
(45) Date of Patent: *May 11, 2010

(54) STRATEGIES FOR COMPRESSING TEXTURES

(75) Inventors: Andrew C. Flavell, Redmond, WA (US); Yan Lu, Beijing (CN); Wen Sun, Anhui (CN); Feng Wu, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/627,171

(22) Filed: Jan. 25, 2007

(65) Prior Publication Data

US 2008/0002895 A1 Jan. 3, 2008

Related U.S. Application Data

(60) Provisional application No. 60/806,171, filed on Jun. 29, 2006.

(51) Int. Cl.
*G06K 9/36* (2006.01)
*G06K 9/00* (2006.01)
*G09G 5/02* (2006.01)
*G06T 17/20* (2006.01)
*G06T 17/00* (2006.01)
*H04B 1/66* (2006.01)
*H04B 14/06* (2006.01)

(52) U.S. Cl. .................. 345/582; 345/423; 345/428; 345/605; 345/555; 382/165; 382/167; 382/232; 382/233; 375/240.1; 375/245

(58) Field of Classification Search .............. 345/418, 345/423, 428, 581–582, 587, 600, 589, 605, 345/549, 552, 555–556; 382/162, 166, 165, 382/167, 232–233, 235, 244, 254, 274, 276, 382/305; 375/240, 240.1, 240.12, 240.23, 375/245, 240.25, 253

See application file for complete search history.

(56) References Cited

U.S. PATENT DOCUMENTS 6,031,575 A * 2/2000 Suzuki et al. .......... 375/240.14

(Continued)

OTHER PUBLICATIONS

Ivanov et al., "Color Distribution for Compression of Textural Data," accessible at <<http://www.fit.com.ru/Surveys/ Publications/Data/ gc2000doc.zip>>, available at least as of Jun. 22, 2006, 7 pages.
Akenine-Moller, et al., "Graphics for the Masses: A Hardware Rasterization Architecture for Mobile Phones," ACM Transactions on Graphics, vol. 22 , Issue 3, Jul. 2003, pp. 801-808.
Kwon et al., "Pyramid Texture Compression and Decompression using Interpolative Vector Quantization", 2000 International Conference Image Processing, vol. 2, 2000, pp. 191-194.

(Continued)

*Primary Examiner*—Wesner Sajous
(74) *Attorney, Agent, or Firm*—Lee & Hayes, PLLC

(57) ABSTRACT

A technique is described for compressing textures for use in a graphics application, such as a 3D game application. The technique includes parsing first-compressed texture information (e.g., S3TC texture information) into respective components of the first-compressed texture information (such as main color information, color index information, main alpha information, and alpha index information). The technique then further compresses the respective components to yield second-compressed texture information (referred to as modified compressed texture information or MCT texture information). The MCT texture information can be stored and then decoded to reconstruct the original S3TC texture information for use in the graphics application. Compared to the use of unmodified S3TC texture information, the technique allows more economical storage of texture information, as well as more efficient loading of the texture information from storage to memory.

18 Claims, 29 Drawing Sheets

U.S. PATENT DOCUMENTS

| | | | |
|---|---|---|---|
| 6,292,194 B1* | 9/2001 | Powell, III | 345/582 |
| 6,819,793 B1* | 11/2004 | Reshetov et al. | 382/166 |
| 6,940,511 B2 | 9/2005 | Akenine-Moller et al. | |
| 6,959,110 B1* | 10/2005 | Danskin et al. | 382/166 |
| 7,039,244 B2 | 5/2006 | Hong et al. | |
| 7,058,218 B1 | 6/2006 | Drebin et al. | |
| 7,171,051 B1* | 1/2007 | Moreton et al. | 382/233 |
| 7,385,611 B1* | 6/2008 | Toksvig et al. | 345/582 |
| 2004/0008780 A1* | 1/2004 | Lai et al. | 375/240.16 |
| 2004/0151372 A1* | 8/2004 | Reshetov et al. | 382/166 |
| 2004/0156543 A1 | 8/2004 | Gardella et al. | |
| 2006/0017722 A1 | 1/2006 | Hong et al. | |
| 2006/0082575 A1 | 4/2006 | Auberger et al. | |
| 2006/0092169 A1 | 5/2006 | Wetzel | |
| 2006/0268990 A1 | 11/2006 | Lin et al. | |
| 2007/0014484 A1 | 1/2007 | MacInnis | |
| 2007/0053431 A1 | 3/2007 | Cammas et al. | |
| 2007/0127812 A1* | 6/2007 | Strom | 382/166 |
| 2007/0160304 A1 | 7/2007 | Berkner et al. | |
| 2007/0206871 A1 | 9/2007 | Jalil et al. | |
| 2007/0248164 A1 | 10/2007 | Zuo et al. | |
| 2008/0152221 A1* | 6/2008 | Kadatch | 382/166 |
| 2008/0232647 A1 | 9/2008 | Yamauchi et al. | |
| 2009/0003692 A1* | 1/2009 | Pettersson et al. | 382/166 |
| 2009/0021521 A1* | 1/2009 | Sorgard et al. | 345/582 |

OTHER PUBLICATIONS

Berillo, "S3TC and FXT1 Texture Compression", retrieved on Apr. 19, 2009 at http://ixbtlabs.com/articles/reviews3tcfxt1/, review, 15 pgs.

"FXT1 Advaced Texture Compression", retrieved on Apr. 29, 2009 at http://www.beyond3d.com/images/articels/46/FXT1/FXT1-1.ppt, 3dfx Presentation, 29 pgs.

* cited by examiner

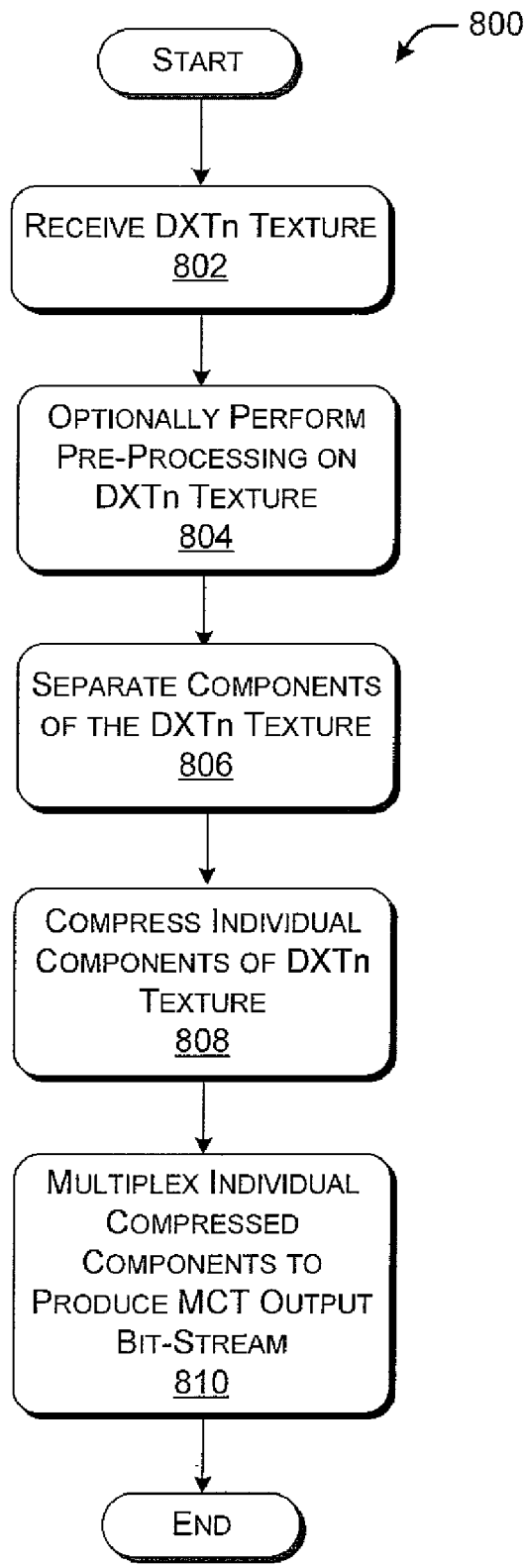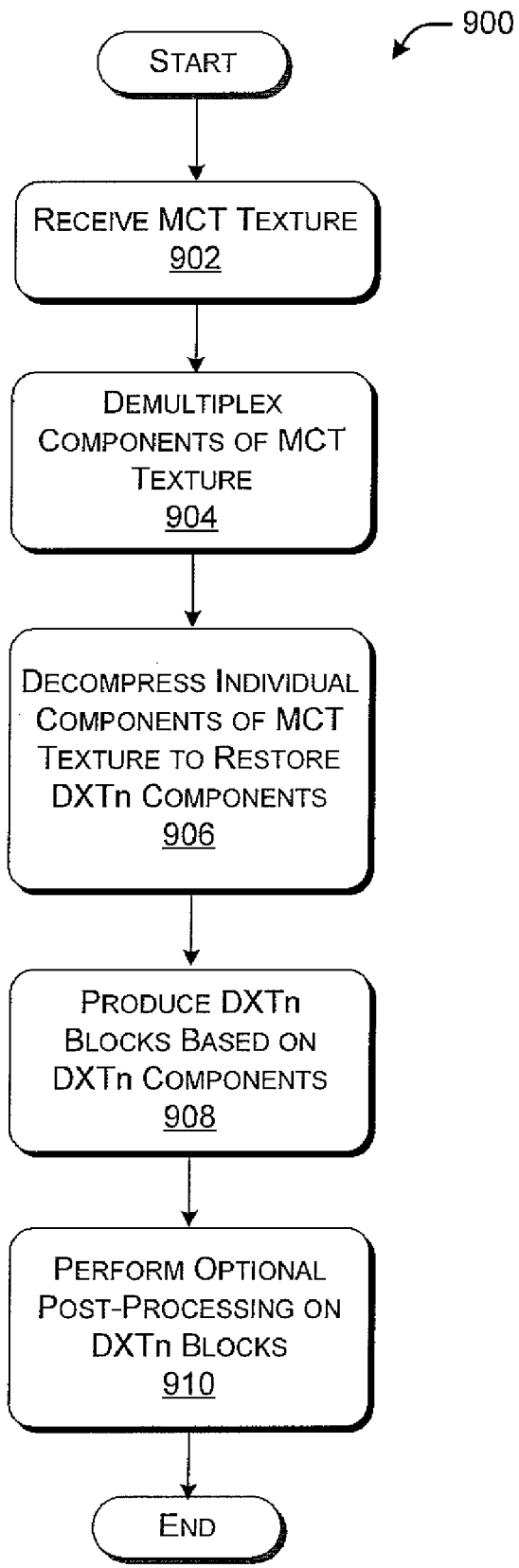
FIG. 8
FIG. 9

WHOLE RECONSTRUCTED DXT1 TEXTURE

IMAGE OF C0

IMAGE OF C1

IMAGE OF CL

IMAGE OF CH

IMAGE OF COLOR INDEX

WHOLE RECONSTRUCTED DXT3 TEXTURE

IMAGE OF DXT3 ALPHA INDEX

WHOLE RECONSTRUCTED DXT5 TEXTURE

IMAGE OF A0

IMAGE OF A1

IMAGE OF AL

IMAGE OF AH

IMAGE OF DXT5 ALPHA INDEX

STRATEGIES FOR COMPRESSING TEXTURES

This application claims the benefit of U.S. Provisional Application No. 60/806,171, filed on Jun. 29, 2006, entitled, "Strategies for Compressing Textures," and naming the inventors of Andrew C. Flavell, Yan Lu, Wen Sun, Feng Wu, and Shipeng Li. This Provisional Application is incorporated by reference herein in its entirety.

This application is also related to Application No. (317511.02, MS1-3213US), filed on the same date as the present application, entitled, "Strategies for Lossy Compression of Textures," naming the same inventors identified above. This related Application is incorporated by reference herein in its entirety.

BACKGROUND

In the field of graphics applications, a texture defines information that can be mapped onto a face of a graphical object. For example, a graphics application can create various objects that simulate the shape a brick wall. A texture bearing the surface appearance of a brick wall can then be mapped to the surface of the objects to create the visual appearance of a brick wall. In general, texture mapping enhances the visual complexity of the 3D objects with relatively small increase in computation.

It may require a significant amount of memory to store raw textures. For this reason, graphics applications commonly compress the textures. In view of the typical use of textures (such as game applications), a compression technique used to compress textures must accommodate the random access of texture information. Thus, not every image compression technique can effectively be used to compress textures.

One commonly used technique to compress textures is S3 Texture Compression (S3TC), which is also referred to as DXTn or DXTC. As to high-level characteristics, S3TC formats use fixed length coding (FLC). Typically, S3TC formats can provide a compression ratio of 8:1 or 4:1 for 32 bpp ARGB textures with little loss in visual quality. S3TC texture images comprise a collection of 4×4 texel blocks, where each block contains 64 or 128 bits of texel data. (A "texel" refers to a unit of texture information.) A S3TC texture image is encoded as a normal 2D raster image in which each 4×4 block is treated as a single pixel.

There are five common S3TC textures formats: DXT1; DXT2; DXT3; DXT4; and DXT5. The different types of S3TC formats are summarized below.

DXT1

The DXT1 texture format can be used for textures that are opaque or have a single transparent color. This format uses 64 bits for each DXT1 block. FIG. 1 shows the layout of an exemplary DXT1 block. The block includes 32 bits of main color information 102 and 32 bits of color index information 104, together defining 16 pixels. More specifically, the color of each pixel in the block can be constructed based on a combination of the main color information 102 and the color index information 104. That is, a 2-bit color index in the color index information 104 specifies the color of an associated pixel, as selected from four color candidates, i.e. color_0, color_1, color_2 and color_3 defined by the main color information 102. Both of the main colors (C0 and C1) are expressed in RGB 5:6:5 format and determine whether the current block is an opaque block or a 1-bit alpha block.

For opaque blocks, the first main color C0 is greater than C1, and the four candidate colors are:

color_0=C0
color_1=C1
color_2=(2×C0+C1+1)/3
color_3=(C0+2×C1+1)/3

Otherwise, for 1-bit transparent blocks, the four candidate colors are:

color_0=C0
color_1=C1
color_2=(C0+C1)/2
color_3=transparent

More generally stated, DXT1 compression operates by linearly fitting all of the 16 pixels in RGB space based on the main colors, where the main colors determine the endpoints of the line segment. The main colors, together with one or two interpolated colors, make a block palette from which the color indices choose the most appropriate color for each pixel. Such a solution works well in practice in many cases, mainly because the local color distribution of most computer-generated images can be represented by linear fitting, unlike the case of many natural images. Further, for the regions in which linear fitting does not work well, the small size of the 4×4 block produces acceptable levels of distortion in the block.

DXT3

The format of DXT3 differs from DXT1's 2-level transparency. More specifically, the compression format of DXT3 uses an alpha 4×4 bitmap for each block preceding 64 bits describing the block color information, to thereby exhibit more complex alpha information. Note the example of a DXT3 block shown in FIG. 2. The block includes color information 202 in combination with 64 bits of alpha information 204. The 64-bit color information 202 is the same as the 64-bit opaque DXT1 color information (102, 104), with the exception that C0 may be not greater than C1 in the case of DXT3. The alpha information 204 stores, for each pixel, 4-bit alpha data. The 4-bit alpha data can be produced through a variety of approaches, such as by dithering or by using the four most significant bits of the original alpha data.

DXT5

The DXT5 format, like the DXT3 format, uses 128 bits to describe a 4×4 block. FIG. 3 shows an exemplary DXT5 block. This block includes 64 bits of color information 302. The DXT5 64-bit color information 302 is identical to that of DXT1 and DXT3. Like DXT3, the DXT5 format differs from the DXT1 format by including 64 bits of alpha information 304. Unlike DXT3, the alpha information 304 includes 48 bits of alpha index information 306 together with 16 bits of main alpha information 308, comprising alpha information A0 and alpha information A1. The 48 bits of alpha index information 306 store 3 bits of index data per pixel.

DXT5 alpha encoding operates on a principal similar to the linear fitting used for color blocks (as described above for DXT1). That is, each pixel's corresponding 3-bit alpha index chooses its alpha value from eight candidate alpha values, alpha_0, alpha_1, . . . , and alpha_7, all of which are derived from the endpoint values defined by A0 and A1. If A0 is greater than A1, six intermediate alpha values are generated by interpolation:

alpha_1=A1
alpha_2=(6×A0+1×A1+3)/7
alpha_3=(5×A0+2×A1+3)/7
alpha_4=(4×A0+3×A1+3)/7
alpha_5=(3×A0+4×A1+3)/7
alpha_6=(2×A0+5×A1+3)/7
alpha_7=(1×A0+6×A1+3)/7

Otherwise, only four intermediate alpha values are interpolated, and the other two alpha values are 0 (fully transparent) and 255 (fully opaque):

alpha_0=A0
alpha_1=A1 alpha_2=(4×A0+1×A1+3)/5
alpha_3 (3×A0+2×A1+3)/5
alpha_4=(2×A0+3×A1+3)/5
alpha_5=(1×A0+4×A1+3)/5
alpha_6=0
alpha_7=255

DXT2 and DXT4

DXT2 compression format is similar to DXT3, while DXT4 compression format is similar to DXT5. DXT2 and DXT4 differ from the above-described formats in that the pixel color values are multiplied by their corresponding alpha values before compression. This can speed up some compositing operations, but it can have the negative effect of losing color information. For this reason, DXT2 and DXT4 are not as widely used in practice as DXT1, DXT3, and DXT5.

S3TC formats are widely used. Nevertheless, these formats may not yield desired performance in all cases. For example, graphics applications continue to incorporate increasing numbers of textures. Further, graphics applications continue to use textures of increasingly larger size. Graphics applications also strive for faster processing speeds to support real-time rendering for complex scenes. These types of demands are particularly prevalent in modern 3D game and simulation applications. These demands raise at least two challenges. First, these types of applications may use a significant amount of memory to store the textures. Second, the applications may take a significant amount of time to load the textures from peripheral devices to memory. This loading time may be longer than the amount of time required by a graphics processing unit (GPU) to consume the data, thus making the loading operation a bottleneck to the speed of the graphics application as a whole. These types of challenges are not necessarily overcome by compressing the textures using S3TC. This is because S3TC compression produces a relatively large file size.

There have been some efforts in devising new texture formats to produce enhanced compression ratios. However, these efforts have not yielded fully satisfactory results. Typically, when the texture compression ratio is increased, the visual quality deteriorates. This type of problematic trade-off occurs, for instance, in fixed length coding (FLC) compression techniques (such as S3TC). Variable length coding techniques (VLC) are widely used in image and video compression applications and provide a satisfactory treatment of compression rate and distortion issues. However, VLC does not support random access well, which makes it ill-suited for texture compression in graphics applications. Another approach is to convert some other kind of non-S3TC format (with a better compression ratio than S3TC) to the S3TC format. But this kind of conversion may be time-consuming, so that it cannot effectively be performed a real-time fashion.

For at least one or more of the above-identified exemplary and non-limiting reasons, there is a need in the art for more satisfactory strategies for compressing and decompressing texture information.

SUMMARY

A technique is described for compressing textures for use in a graphics application. The technique includes parsing first-compressed texture information (e.g., S3TC texture information) into respective components of the first-compressed texture information (such as main color information, color index information, main alpha information, and alpha index information). The technique then further compresses the respective components to yield second-compressed texture information, e.g., modified compressed texture (MCT) information. The MCT texture information can be stored and then decoded in real-time to reconstruct the original S3TC texture information.

In one particular implementation, the technique uses one or more lossless algorithms for further compressing the first-compressed texture information. Exemplary algorithms can include Lempel-Ziv, JPEG, JBIG, predictive coding using a Haar transform, and context-based arithmetic encoding.

This Summary section refers to exemplary manifestations of the subject matter described herein, and hence does not limit the scope of the invention set forth in the Claims section.

BRIEF DESCRIPTION OF THE DRAWINGS

FIG. 8 shows an exemplary procedure which explains a manner of operation of the encoder of FIG. 6.

FIG. 9 shows an exemplary procedure which explains a manner of operation of the decoder of FIG. 7.

Figure 1:
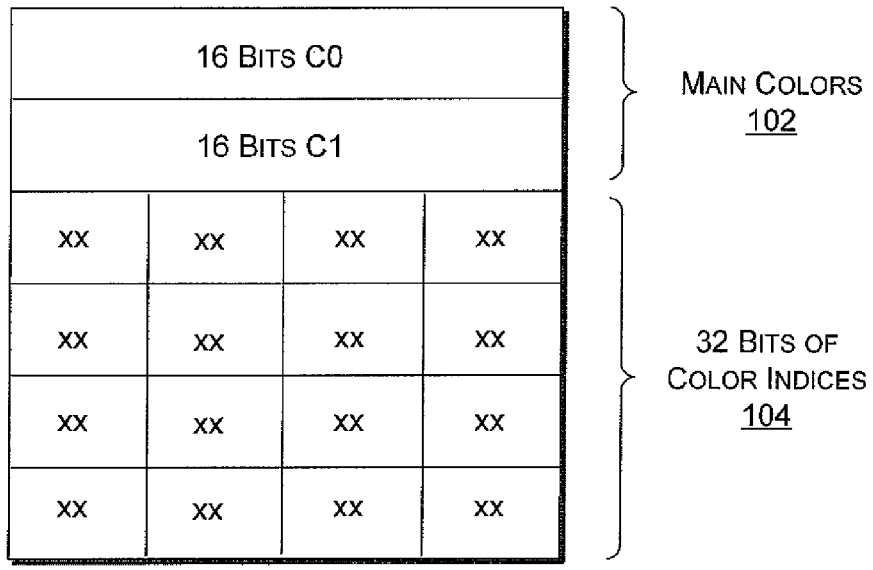
FIGS. 1-3 show examples of the DXT1, DXT3, and DXT5 formats of image compression, respectively.
Figure 2:
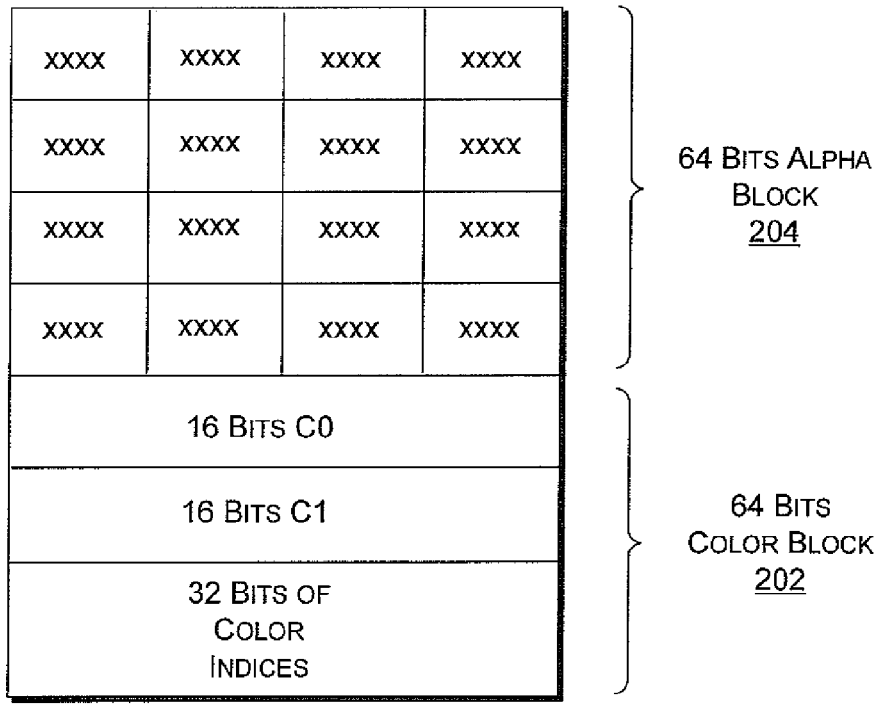
Figure 3:
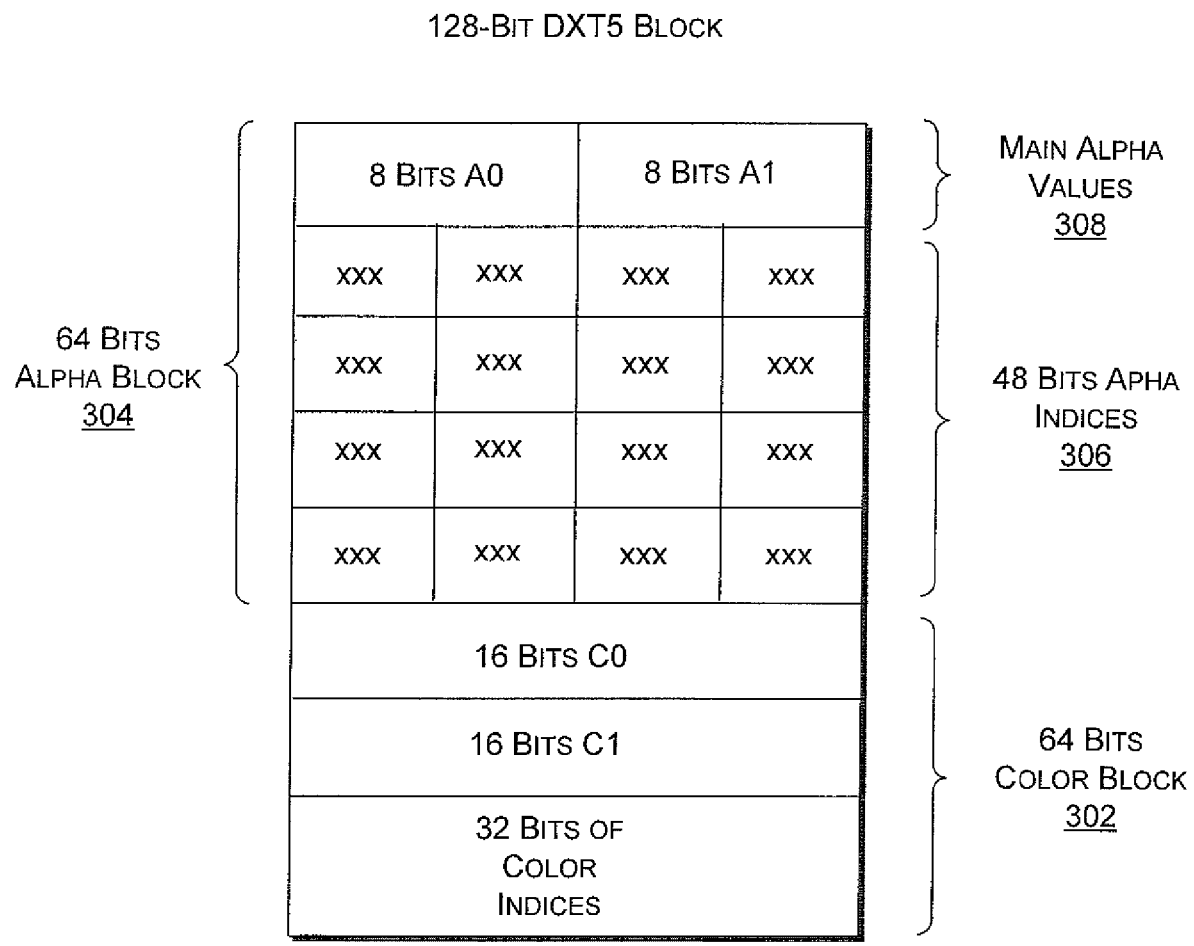

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The disclosure sets forth a new strategy for compressing texture information. By way of overview, the strategy involves parsing S3TC-compressed blocks of information into the individual components of the blocks (main color information, color index information, main alpha information, and alpha index information), and then further compressing the individual components using different respective coding techniques, such as different respective variable length coding (VLC) techniques. This operation produces further-compressed texture information, which is referred to as modified texture compressed (MCT) information herein. The MCT texture information can be stored in a storage medium and then on-line retrieved from the storage medium when needed. Upon retrieval, the MCT texture information can be fast-decoded back into S3TC-compressed blocks of information. The S3TC texture information can then be directly consumed by a graphics application, such as a game application, simulation application, and so on. Or the S3TC texture information can be converted to raw texture information for use by the graphics application.

In one implementation, the technique can be used to supplement pre-existing S3TC functionality, that is, by further compressing the output of this pre-existing S3TC functionality. In another application, the technique can be integrated with S3TC functionality to produce a new kind of codec for generating MCT texture information from raw texture information, and for decoding MCT texture information into S3TC texture information or raw texture information.

To facilitate discussion, the compression techniques are described as acting on S3TC compressed texture information, also referred to as DXTn and DXTC formats. Even more specifically, the compression techniques are described as particularly applicable to the DXT1, DXT3, and DXT5 formats. (DXT2 files can be compressed using the same basic techniques as DXT3, and DXT4 files can be compressed with the same basic techniques as DXT5.) However, the compression techniques can be applied to other kinds of formats. For instance, the compressions techniques can be applied to other base compression standards that use fixed length coding (FLC).

The compression techniques described herein confer a number of benefits. Generally, the MCT texture information represents an enhanced compression of texture information compared to the original S3TC texture information, which enables the MCT texture information to be more economically stored on a storage medium, and then more efficiently loaded into memory when needed to support real-time rendering. By virtue of the enhanced compressed format, the loading process is less likely to represent a bottleneck in the GPU's consumption of texture information. Moreover, the technique preserves the underlying random access capabilities of S3TC, while producing enhanced compression that does not suffer from unacceptable distortion of the texture information.

The disclosure includes the following sections:

Section A provides an overview of the compression technique described herein. A first part of this section sets forth an overview of the compression technique as a whole. A second part of this section sets forth further overview information regarding an encoder (X-Encoder) for further compressing S3TC texture information to produce modified texture information (MCT), and a decoder (X-Decoder) for decoding the MCT texture information to reconstruct the S3TC texture information.

Section B provides further exemplary details regarding techniques for encoding individual components of the S3TC texture information to produce MCT texture information, and for decoding the MCT texture information to reconstruct the individual components of the S3TC texture information.

Section C provides exemplary details regarding an exemplary processing environment in which the compression technique can be applied.

Section D provides examples of various texture images produced by the compression technique.

As to terminology, any of the functions described with reference to the figures can be implemented using software, firmware, hardware (e.g., fixed logic circuitry), manual processing, or a combination of these implementations. The term "logic, "module," "component," or "functionality" as used herein generally represents software, firmware hardware, or a combination of these implementations. For instance, in the case of a software implementation, the term "logic," "module," "component," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules, components and functionality into distinct units may reflect an actual physical grouping and allocation of such software, firmware, and/or hardware, or can correspond to a conceptual allocation of different tasks performed by a single software program, firmware program, and/or hardware unit. The illustrated logic, modules, components, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

The techniques described herein are also described in various flowcharts. To facilitate discussion, certain operations are described in these flowcharts as constituting distinct steps performed in a certain order. Such implementations are exemplary and non-limiting. Certain operation can be grouped together and performed in a single operation, and certain operations can be performed in an order that differs from the order employed in the examples set forth in this disclosure.

A. Overview of Exemplary Approach

A. 1. Overview of Overall Encoding-Decoding Strategy

Figure 4:
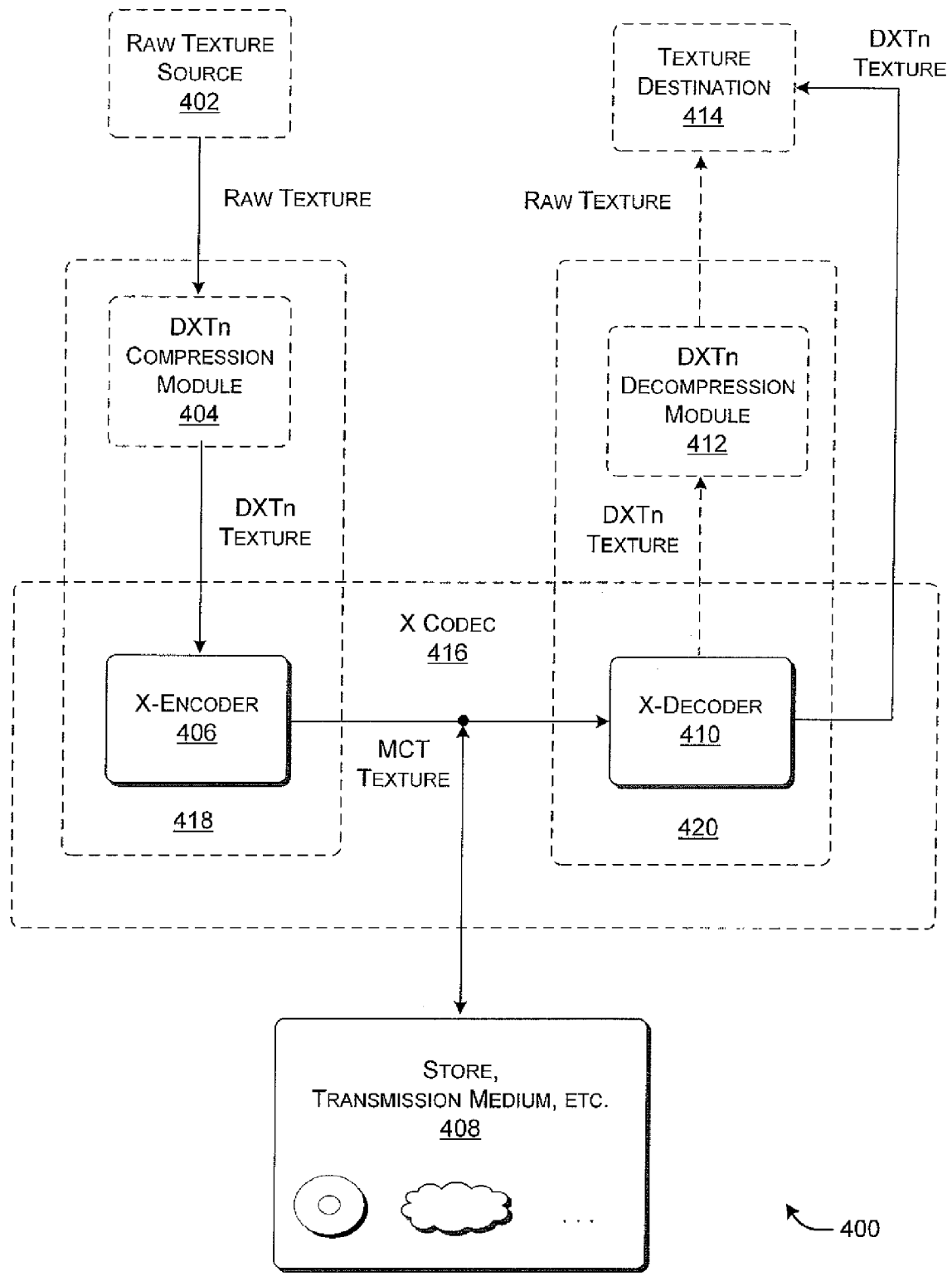
FIG. 4 shows an overview of a compression and decoding system that involves further compressing S3TC texture information.

FIG. 4 shows a system 400 that illustrates an exemplary coding architecture for encoding a modified compressed texture (MTC) and for then decoding it.

To begin with, the system 400 supplies raw texture information from any source 402 of texture information. For example, the source 402 may represent an application used to create texture information for a game application.

A DXTn compression module 404 uses S3TC technology to compress the raw texture information produced by the source 402. Or another kind of compression technology can be used, such as another type of compression technology that uses fixed length coding (FLC). The DXTn compression module 404 generates DXTn texture information, also generically referred to as "first-compressed texture information" herein.

An X-Encoder 406 further compresses the DXTn texture information into modified compressed texture (MCT) information, also generically referred to as "second-compressed information" herein (meaning that the X-Encoder 406 applies a second level of compression "on top" of the DXTn compression). (Note that the label "X-Encoder" is merely an arbitrary label of convenience.) As will be described in later parts of this disclosure in detail, the X-Encoder 406 operates by parsing blocks of texture information in the DXTn texture information into individual DXTn components, and then further compressing the DXTn components using different respective compression techniques.

At this point, the system 400 can retain the MTC texture information in some intermediary state prior to decoding, represented in FIG. 4 by unit 408. For example, unit 408 may represent any type of data store (e.g., magnetic or optical disc, static memory, etc.). Or unit 408 may represent the transmission of the MTC texture information over a network from a source site to a destination site, and so on. In any event, because the MTC texture files are smaller in size (compared to the DXTn texture information), the retention of the MTC texture files can be performed in an economical manner, thereby potentially reducing the storage needs of a graphics application.

In the decoding stage of the system 400, an X-Decoder 410 loads the MTC texture information from the unit 408 and decodes it to produce the DXTn texture information. (Note that the label "X-Decoder" is merely an arbitrary label of convenience.) The loading and decoding operation can represent an integrated operation or a time-staggered operation (e.g., loading first, followed at some later time by decoding). Decoding in the X-Decoder 410 may represent the complement of the processing that was performed by the X-Encoder 406. For instance, decoding can proceed on a component-by-component basis, where the X-Decoder 410 may apply different decoding strategies to recover different components of the DXTn texture information. Note that, due to the reduced size of the MCT texture files, the decoding process can be performed very quickly. In one exemplary implementation, the decoding process can be performed on a CPU.

After the decoding performed by the X-Decoder 410, the DXTn texture information can be maintained in memory for use by a texture destination 414. The texture destination 414 represents any end-use of the texture information, such as a graphics application (e.g., a game application, simulation application, etc.). In one implementation, the texture destination 414 can directly use the DXTn texture information. This is because some graphics processing units (GPUs) can directly process texture information in the S3TC format. FIG. 4 represents this processing path with a solid line that connects the X-Decoder 410 to the texture destination 414.

In another application, a DXT decompression module 412 can be used to convert the DXTn information into raw texture information (although this raw texture information may not exactly represent the original raw texture information produced by the source 402). FIG. 4 represents this implementation by the dashed line connecting the X-Decoder 410 to the texture destination 414, via the DXT decompression module 412.

Considered on a broader level, the functionality that creates and then decodes the MCT texture information forms a novel codec, referred to by the arbitrary label as "X-Codec" 416. The X-Codec 416 includes the X-Encoder 406 and the X-Decoder 410. In one implementation, the X-Codec 416 represents stand-alone logic that can be added to pre-existing logic which creates and optionally decodes the DXTn texture information. In another implementation, the X-Codec 416 can be integrated with the DXTn compression module 404 and/or the optional DXTn decompression module 412, that is, by incorporating the additional functionality in boxes 418 and/or 420. In this latter scenario, the expanded X-Codec can represented an integrated codec which can produce the MCT texture information from the raw texture information, and then convert the MCT texture information to DXTn texture information or the raw texture information.

Figure 5:
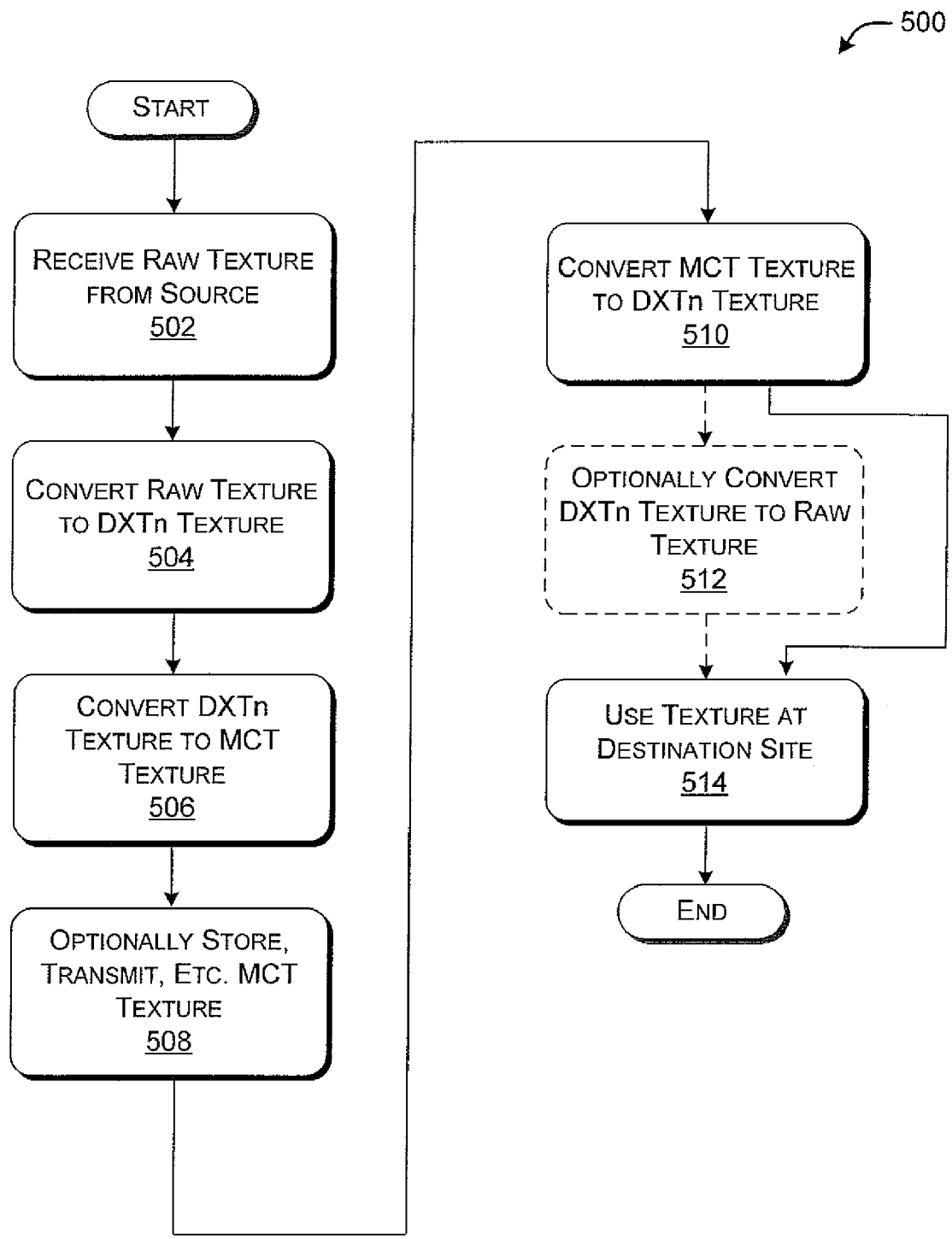
FIG. 5 shows an exemplary procedure which explains a manner of operation of the system of FIG. 4.

FIG. 5 shows a procedure 500 which represents an overview of the operation of the system 400 of FIG. 4. As the functionality of the system 400 has already been described, the discussion for FIG. 5 will serve primarily as summary and review.

In step 502, the system 400 receives raw image information from the source 402.

In step 504, the DXTn compression module 404 converts the raw texture information into DXTn texture information.

In step 506, the X-Encoder 406 converts the DXTn texture information into MCT texture information.

In step 508, the system 400 retains the MTC texture information in some intermediary form prior to decoding, such as by storing the MTC texture information on a disc.

In step 510, the X-Decoder 410 loads the MTC texture information into memory and decodes it.

In step 514, a graphics application directly makes use of the DXTn texture information, such as by mapping this texture information onto a graphical object. FIG. 5 represents this implementation by a solid line that connects step 510 to step 514.

Alternatively, in step 512, the DXTn Decompression module 412 can optionally convert the DXTn texture information into raw texture information for use by a graphics application. FIG. 5 represents this implementation by a dashed line that connects step 510 to step 514 via step 512.

A.2. Overview of Encoder and Decoder

Figure 6:
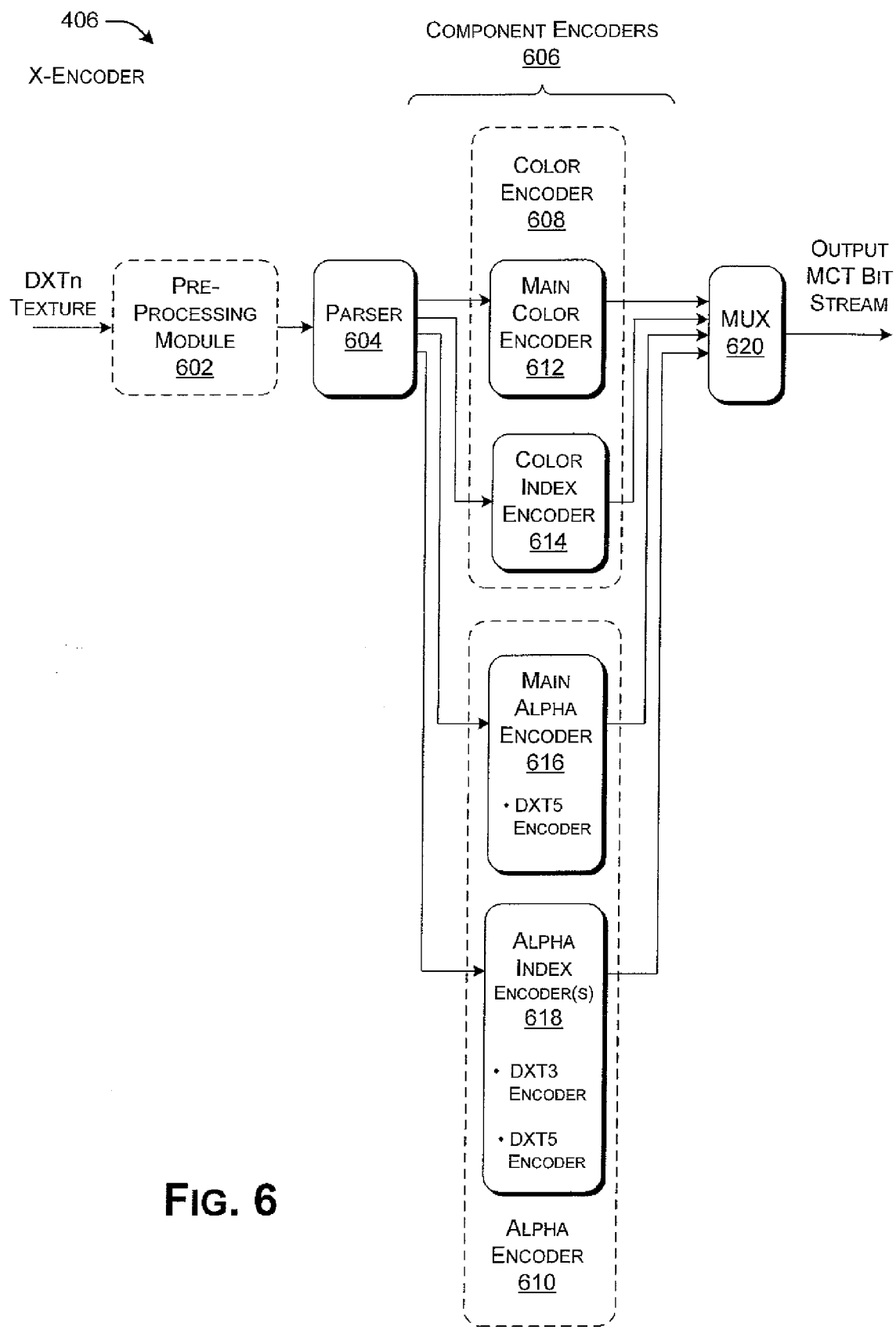
FIG. 6 shows an encoder (X-Encoder) for encoding S3TC texture information to produce modified compressed texture (MCT) information.
Figure 7:
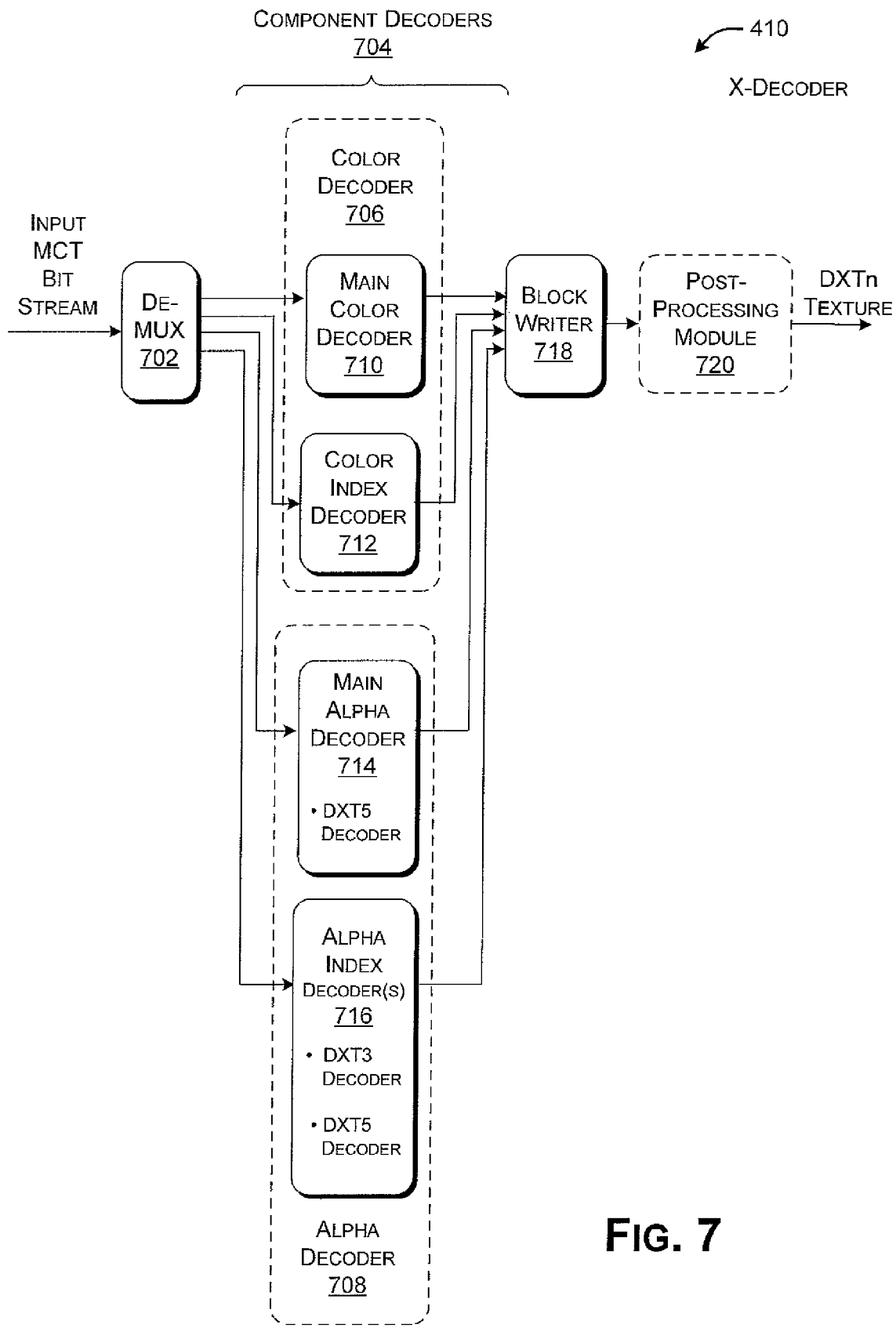
FIG. 7 shows a decoder (X-Decoder) for decoding the MCT information produced by the encoder of FIG. 6.

FIG. 6 shows further details regarding the X-Encoder 406, while FIG. 7 shows further details regarding the X-Decoder 410.

By way of introduction, recall from the discussion in the Background section that, in the S3TC texture format, the texture image is divided into blocks, and each block contains several components. In general, these components include: main color information and color index information for DXT1, DXT3 and DXT5; alpha index information for DXT3 and DXT5; and main alpha information for DXT5. Accordingly, the X-Codec 416 is also block-based, in which the different techniques are provided to handle the different DXTn components.

At the outset, it should be pointed out that different versions of the DXTn format have different components. Therefore, depending on what type of DXTn format is being processed, different components in FIGS. 6 and 7 may be selectively used, and not others. As a matter of explanatory convenience, FIGS. 6 and 7 shows versions of the X-Encoder 406 and X-Decoder 410 that includes an encompassing set of possible components. The X-Encoder 406 and X-Decoder 410 can be designed to include all of the components shown in FIGS. 6 and 7, and then invoke whatever components are required when processing particular types of DXTn texture data. Or the X-Encoder 406 and X-Decoder 410 can be designed to include only a subset of the illustrated components if some of the components will not be utilized for a particular processing environment.

Turning first to FIG. 6, the X-Encoder 406's features will be described generally from left to right.

Beginning with the far left, the X-Encoder 406 includes an optional pre-processing module 602. The pre-processing module 602 can perform different functions depending on the processing environment to which it is applied. In one case, DXTn texture information can be pre-processed to increase correlation across neighboring DXTn blocks. More specifically, in traditional DXTn compression, the 4×4 DXTn blocks are usually compressed in independent fashion, which achieves minimum distortion in terms of each DXTn block. However, the DXTn blocks produced by individual compression operations have less inter-block correlation compared to the case of joint compression, which makes further compression less efficient. To address this issue, the pre-processing module 602 can pre-process the DXTn textures prior to further compression being performed. The benefit of this operation is to increase the correlation across neighboring DXTn blocks under a pre-defined distortion constraint, to thereby improve the quality of encoding. A number of pre-processing algorithms can be used to achieve this purpose. For instance, the main colors are sometimes outside the actual color range in some blocks; that is, in such a block, there are no pixels that have the same color as C0 or C1, which may lead to large fluctuation of the main colors between neighbor blocks. In this case, the pre-processing module 602 can change C0 and C1 to the exact boundaries of the actual color range.

The X-Encoder 406 next includes a parser 604. The purpose of the parser 604 is to decompose blocks of DXTn texture information into their respective components (e.g., main color information, color index information, alpha index information for DXT3 and DXT5 formats, and main alpha information for DXT5 format). The parser 604 can perform this function by identifying pre-determined fields in the DXTn blocks and extracting the information in these fields.

The X-Encoder 406 next includes a series of encoders 606 designed to encode different components of the DXTn texture information using potentially different techniques. As explained above, FIG. 6 inclusively shows a complete set encoders, but only a subset of these encoders may be invoked depending on what type of DXTn format is being processed at any moment. Generally, the components 606 include various encoders 608 designed to process color information, and other encoders 610 designed to process alpha information. One or more of the components 606 can potentially share processing functionality with other components.

The color information encoders 608 include a main color encoder 612 for encoding main color information in the DXTn information, namely the C0 and C1 color information in the DXT1, DXT3, and DXT5 formats. The color information encoders 608 also include a color index information encoder 614 for encoding color index information in the DXT1, DXT3, and DXT5 formats.

The alpha information encoders 610 include a main alpha information encoder 616 for encoding main alpha information in the DXT5 format, namely the A0 and A1 alpha information in this format. The alpha information encoders 610 also include one or more alpha index encoders 618 for encoding alpha index information in the DXT3 and DXT5 formats.

The X-Encoder 406 includes a multiplexer 620 for multiplexing together the outputs of all of the invoked components in the set of components 606. The output of the multiplexer 620 is a MCT stream of doubly-compressed texture information, meaning that the texture information is first compressed using S3TC, and then the DXTn components are separately compressed by the X-Encoder 406.

FIG. 7 shows exemplary details of the X-Decoder 410 of FIG. 6. From left to right, the X-Decoder 410 first includes a demultiplexer 702. The demultiplexer 702 receives an input MCT stream (e.g., from a disc storage) and separates its individual components, where the components correspond to the separate components created by the encoders 606 of the X-encoder 406.

The X-Decoder 410 next includes a series of decoders 704 which are the counterparts of the encoders 606 of the X-Encoder 406. Namely, the decoders 704 include color information decoders 706, and alpha information decoders 708.

The color information decoders 706 include a main color decoder 710 for decoding main color information in the DXTn information, namely for restoring the C0 and C1 color information in the DXT1, DXT3, and DXT5 formats. The color information decoders 706 also include a color index information decoder 712 for decoding color index information in the DXT1, DXT3, and DXT5 formats.

The alpha information encoders 708 include a main alpha information decoder 714 for decoding main alpha information in the DXT5 format, namely for restoring the A0 and A1 alpha information in this format. The alpha information decoders 708 also include one or more alpha index decoders 714 for decoding alpha index information in the DXT3 and DXT5 formats.

A block writer 718 merges together the respective outputs of the decoders 704, to thereby reconstruct the DXTn information.

An optional post-processing module 720 performs post-processing. The post-processing on the reconstructed DXTn information improves its quality.

FIG. 8 shows a procedure 800 that sets forth a manner of operation of the X-Encoder 406 shown in FIG. 6. FIG. 9 shows a procedure 900 that sets forth a manner of operation of the X-Decoder 410 shown in FIG. 7. As the operations of the X-Encoder 406 and X-Decoder 410 have already been set forth above, the following discussion will serve primary as summary and review.

Starting with FIG. 8, in step 802, the X-Encoder 406 receives the DXTn texture information.

In step 804, the pre-processing module 602 optionally performs pre-processing on the DXTn texture information.

In step 806, the parser 604 separates the individual components of the DXTn texture information.

In step 808, the appropriately invoked encoders 606 encode the separated components of the DXTn texture information.

In step 810, the multiplexer 620 multiplexes together the encoded components of the DXTn texture information to produce the MCT texture information.

As to the decoding procedure of FIG. 9, in step 902, the X-Decoder 410 receives the stream of MCT texture information, e.g., from a storage disc.

In step 904, the demultiplexer 702 separates the components of the MCT stream into individual components.

In step 906, the appropriately invoked decoders 706 decode the individual components of the MCT texture information to reconstruct the DXTn components.

In step 908, the block writer 718 constructs DXTn blocks from the decoded DXTn components. This results in the reconstruction of the DXTn stream.

In step 910, the post-processing module 720 optionally performs post-processing on the DXTn stream to improve its quality.

B. Exemplary Implementations of Approach

Each of the encoders 606 of FIG. 6 and the decoders 704 of FIG. 7 can be implemented in different ways. This section sets forth several implementations of these encoders 606 and decoders 704. The examples presented here are representative and non-limiting; other approaches can also be used.

By way of overview, some of the coding and decoding techniques use lossless compression, in which there is no loss of information when the DXTn texture is further compressed. Other of coding and decoding techniques use lossy compression, in which there is some loss of information when the DXT texture information is compressed (but the artifacts produced by the loss of information are considered acceptable).

In the following description, certain terms are used which are well understood to one having skill in the art, including JPEG coding, JBIG coding, predictive coding, context-based arithmetic coding, vector quantization, and so forth. Reference material which describes these known terms and techniques include, for example: K. Sayood, *Introduction to Data Compression*, Third Edition, Morgan Kaufmann series in Multimedia Information and Systems, 2005; R. Clarke, *Digital Compression of Still Images and Video (Signal Processing and its Applications)*, Academic Press, 1995; and W. Kou, *Digital Image Compression: Algorithms and Standards*, Kluwer Academic Publishers Group, 1995.

B.1. Main Color Encoding and Decoding

Recall that the main color information in a DXTn block comprises 16-bit main color information C0 and 16-bit main color information C1. Typically, the main colors from the neighboring blocks in a DXTn texture are very similar. The parser 604 extracts the main colors C0 and C1 in a DXTn texture to provide a C0 image and a C1 image. Then, the main color encoder 612 further separately compresses these C0 and C1 images. The main color decoder 710 reconstructs the C0 and C1 image information.

Different techniques can be used to implement the main color encoder 612. Different complementary techniques can be used to implement the main color decoder 710 of FIG. 7. Three representative techniques are described below.

Lempel-Ziv

Figure 10:
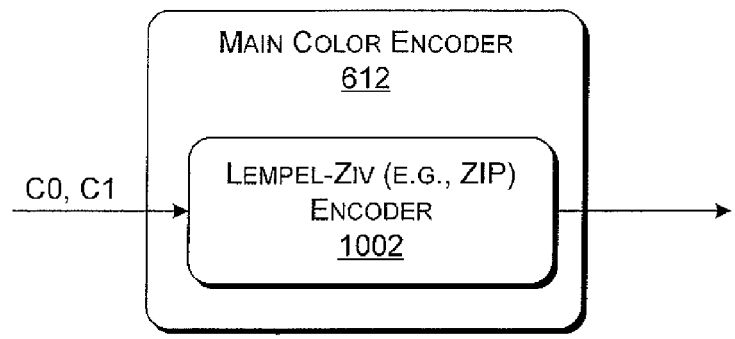
FIGS. 10-12 show different exemplary implementations of a main color encoder used in the encoder of FIG. 6.
Figure 13:
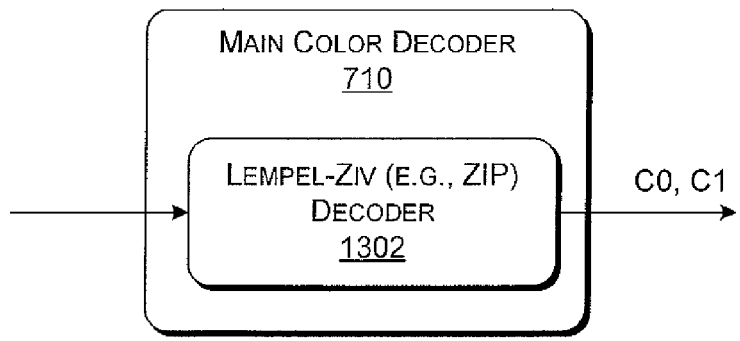
FIGS. 13-15 show different exemplary implementations of a main color decoder used in the decoder of FIG. 7.

The main color information can be lossless-compressed using Lempel-Ziv coding, e.g., as provided by ZIP format coding. Lempel-Ziv coding refers to algorithms for lossless compression coding that were developed by or based at least on the work of information theorists Abraham Lempel and Jacob Ziv. FIG. 10 shows the implementation of the main color encoder 612 using a Lempel-Ziv encoder 1002. FIG. 13 shows the implementation of a complementary main color decoder 710 using a Lempel-Ziv decoder 1302.

JPEG-LS

Figure 11:
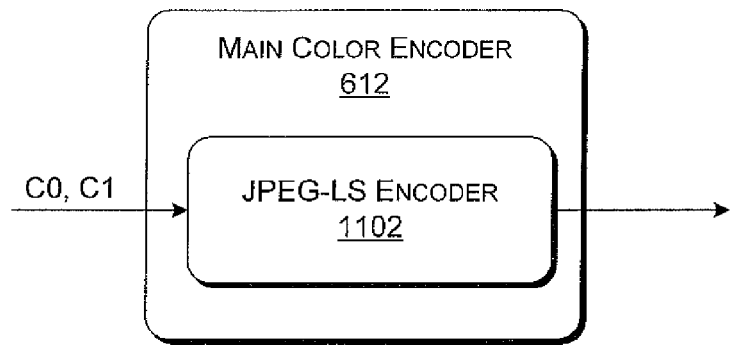
Figure 14:
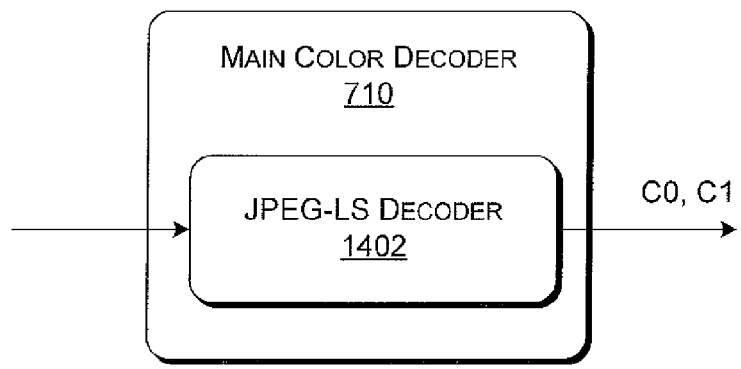

The main color information can be lossless-compressed using JPEG-LS coding. JPEG, as used in JPEG-LS, is an acronym that represents "Joint Experts Photographic Expert Group", or a committee that developed the JPEG data compression standard. More specifically, JPEG-LS is a lossless compression standard for continuous-tone images developed by ISO/IEC JTC1/SC29/WG1. FIG. 11 shows the implementation of the main color encoder 612 using a JPEG-LS encoder 1102. FIG. 14 shows the implementation of a complementary main color decoder 710 using a JPEG-LS decoder 1402.

Predictive coding

Recall that C0 and C1 in a DXTn block represent two endpoints in RGB space, which are used for the linear interpolation of the actual colors. In practice, the two main color images (C0 and C1) are very similar. Based on this observation, the correlation between C0 and C1 can be exploited to further compress this information.

In operation, the main color encoder 612 can first convert the C0 and C1 information to CL and CH information via a Haar transform. The CL and CH information respectively denote low-pass and high-pass signals, defined as follows:

$CH = C0 - C1$ $CL = C1 + (CH+1)/2.$

More specifically, the C0 and C1 information contain R, G, and B components in RGB space. The Haar transform is individually applied to each component.

Then, the main color encoder 612 can code the CL image with spatial prediction. Namely, for each pixel in the CL image, prediction is from the pixel's left or upper neighbor. The main color encoder 612 can encode the prediction direction and the residue with an arithmetic coder. The main color encoder 612 can directly encode the CH image with an arithmetic coder.

At the main color decoder 710, the CL image and the CH are decoded, respectively. Afterwards, the C0 and C1 images can be reconstructed via the inverse Haar transform, that is:

$C1 = CL - (CH+1)/2$ $C0 = C1 + CH.$

Figure 12:
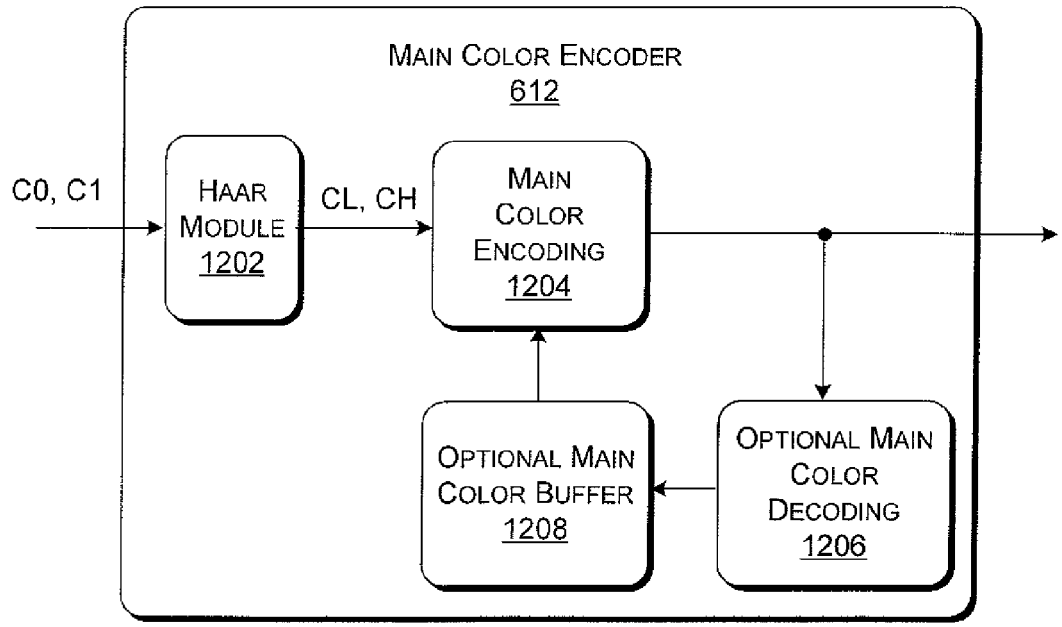

FIG. 12 describes a main color encoder 612 which implements the above-described predictive approach. In this technique, a Haar module 1202 performs a Haar transform on the C0 and C1 information to produce CL and CH information based on the formula set forth above. Then, a main color encoding module 1204 encodes the CL and CH information in the manner described above.

The main color encoder 612 optionally can include a process for main color decoding (implemented by a main color decoder 1206 in conjunction with a main color buffer 1208). Since the current main colors are lossless-encoded, the decoding process can be omitted. However when the proposed approach is extended to lossy encoding of main colors, a decoding process (implemented by decoder 1206) can be performed to reconstruct the major colors for the predictive encoding of the following blocks.

The role of the loop associated with the decoder 1206 is to avoid the mismatch between the encoder and the decoder. In the case of lossy encoding, the input main color in the encoder may not always be equal to the reconstructed main color in the decoder. Since the main color of the current block serves as the prediction in the encoding/decoding of the following blocks, it is desirable to ensure that the prediction remains the same in both the encoder and the decoder. Therefore, it is desirable to reconstruct the main color with a decoding process in the encoder.

More specifically, the decoding process includes two operations. The first operation is to reconstruct the residue. In the case of lossy encoding, the reconstructed residue may not always be equal to its corresponding residue produced in the encoder. For example, if the scalar quantization is performed on the residue in the lossy encoding, the reconstruction of the residue indicates an inverse quantization process. The second operation is to add the reconstructed residue to the prediction value to reconstruct the main color.

Figure 15:
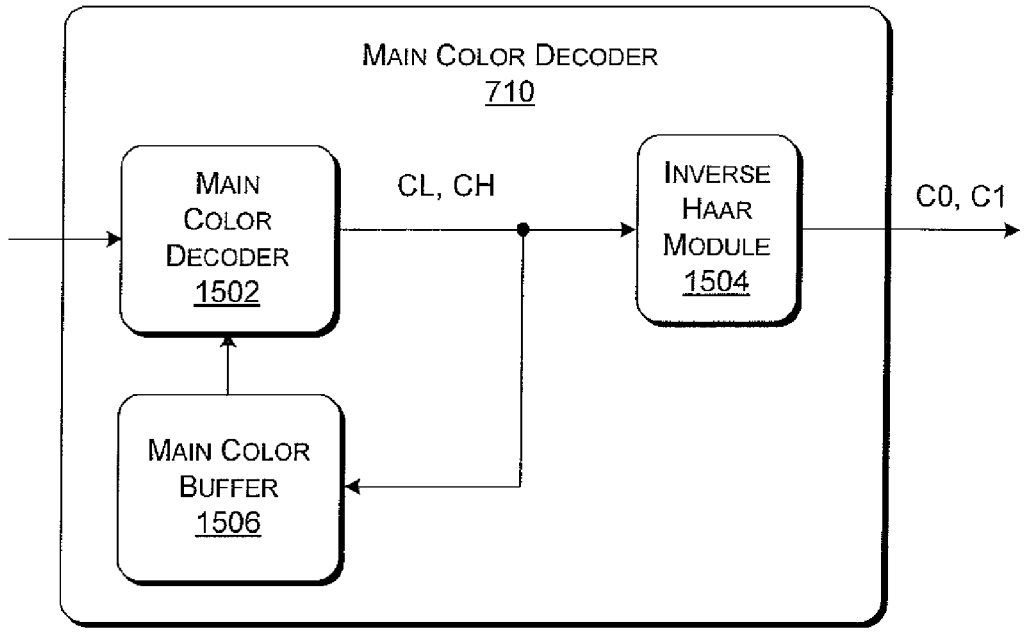

FIG. 15 shows the implementation of a complementary main color decoder 710 using the predictive approach. This decoder 712 includes a main color decoder 1502 in conjunction with a color index buffer 1506 to reconstruct the CL and CH information, and then an inverse Haar module 1504 to reconstruct the C0 and C1 information using an inverse Haar transform (defined above).

Figure 16:
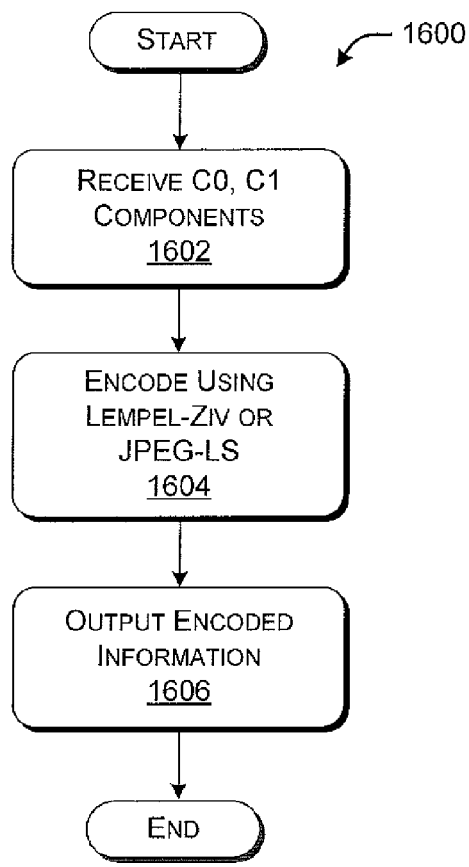
FIGS. 16 and 17 show exemplary procedures which explain a manner of operation of the main color encoders of FIGS. 10-12.

FIG. 16 shows a procedure 1600 which explains an exemplary manner of operation of the Lempel-Ziv and JPEG-LS coding solutions of FIGS. 10 and 11.

In step 1602, the main color encoder 612 receives the C0 and C1 information.

In step 1604, the main color encoder 612 encodes the C0 and C1 information using either the Lempel-Ziv approach (e.g., the ZIP approach), or the JPEG-LS approach In step 1606, the main color encoder 612 outputs the encoded component generated according to the above-described Lempel-Ziv approach or the JPEG-LS approach.

Figure 18:
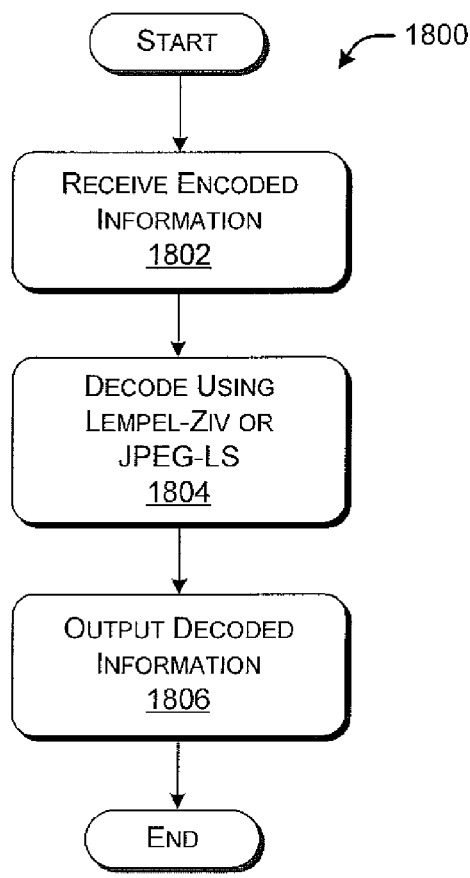
FIGS. 18 and 19 show exemplary procedures which explain a manner of operation of the main color decoders of FIGS. 13-15.

FIG. 18 shows a procedure 1800 for decoding main color information, which is complementary to the procedure 1600 of FIG. 16.

In step 1802, the main color decoder 710 receives encoded main color information.

In step 1804, the main color decoder 710 decodes the main color information using either the Lempel-Ziv approach (e.g., the ZIP approach), or the JPEG-LS approach, to thereby reconstruct the C0 and C1 information.

In step 1806, the main color decoder 710 outputs the decoded main color information.

Figure 17:
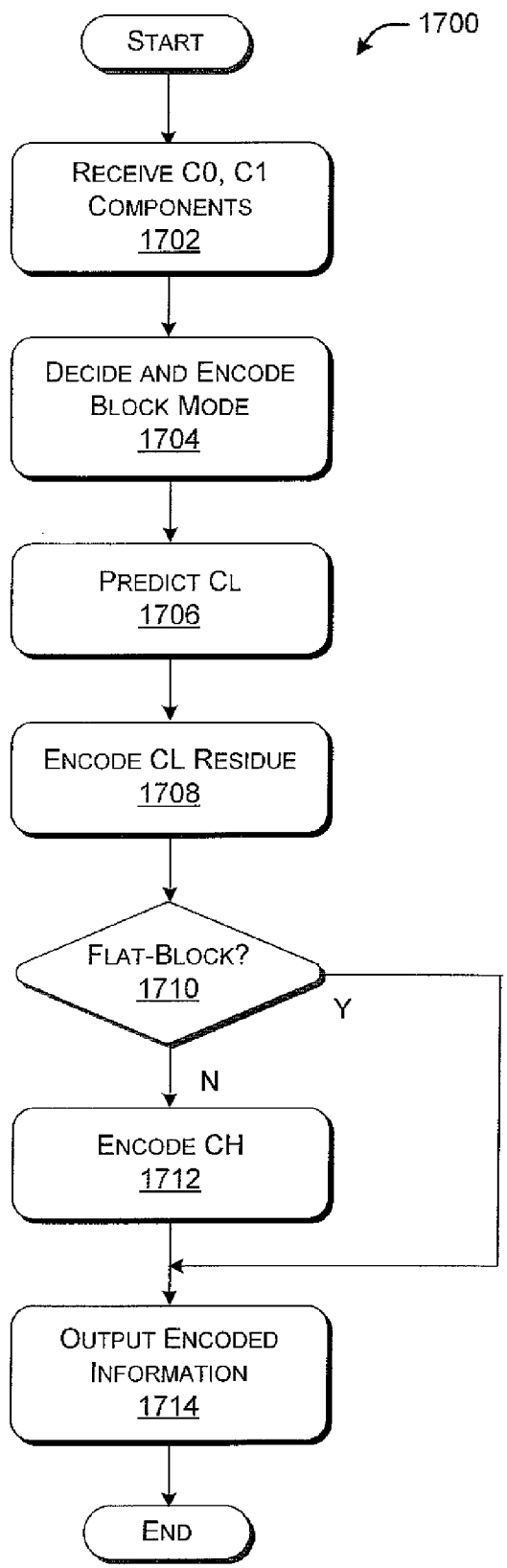

FIG. 17 shows a procedure 1700 which explains an exemplary manner of operation of the predictive coding solution of FIG. 12.

In step 1702, the main color encoder 612 receives the C0 and C1 information In step 1704, the main color encoder 612 determines whether the block mode of a received DXTn block corresponds to a flat-block mode or a non-flat-block mode. A flat-block indicates that the current C0 and C1 information are identical, or, in other words, CH=0. A non-flat-block indicates that the current C0 and C1 information are not identical.

In steps 1706 and 1708, for both flat-block and non-flat-block modes, the main color encoder 612 predicts CL and then encodes the CL residue. As described above, the prediction is from the CL of the left or the upper DXTn block. The prediction direction is selected to be one that has smaller overall prediction errors. The prediction direction is encoded with an arithmetic coder. The CL residue is also encoded with a context-based arithmetic coder (to be described below).

In step 1712, for the non-flat-block mode (as determined in branching block 1710), the main color encoder 612 further encodes CH with the arithmetic coder.

Note that, in the coding of the CL residue and CH, the three components (R, G and B) are individually processed. In particular, R is encoded at first. G and B are subsequently encoded, where R is taken as a context in the arithmetic coder.

In step 1714, the main color encoder 612 outputs the encoded component generated according to the above-described approach.

Figure 19:
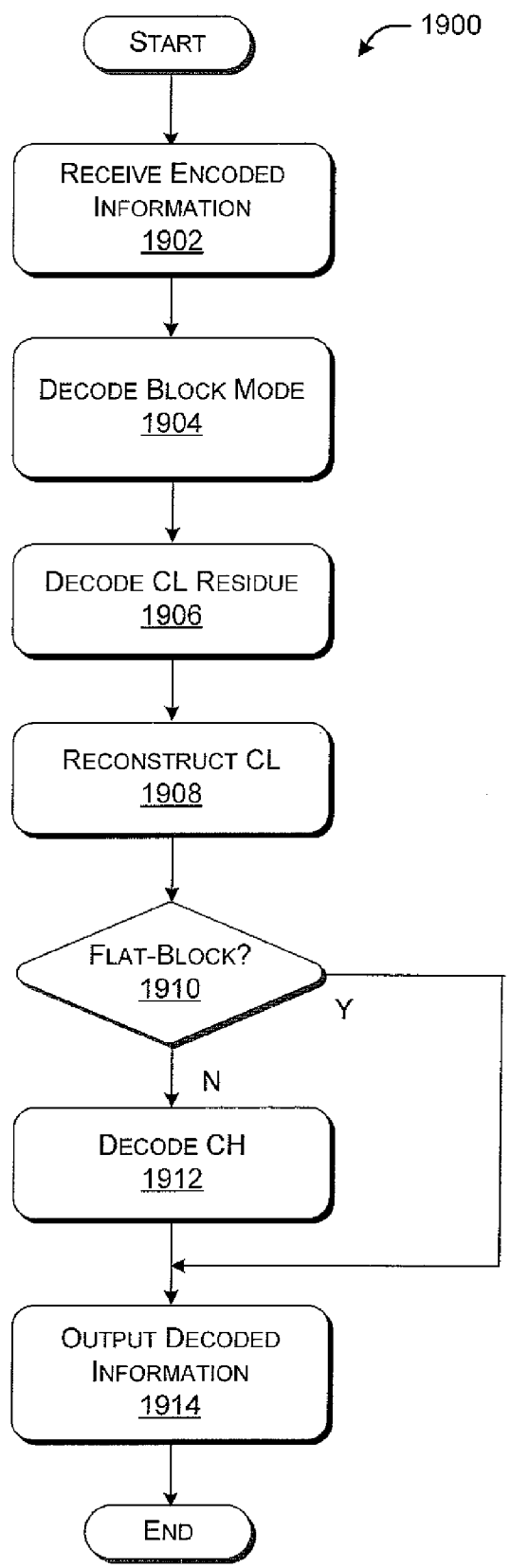

FIG. 19 shows a procedure 1900 for decoding main color information, which is complementary to the predictive coding procedure 1700 of FIG. 17.

In step 1902, the main color decoder 710 receives the encoded main color information.

In step 1904, the main color decoder 710 decodes the above-described block mode.

In step 1906, for both types of modes, the main color decoder 710 decodes the CL residue.

In step 1908, the main color decoder 710 achieves the prediction of CL after decoding the prediction direction, and then the main color decoder 710 reconstructs the CL.

In step 1912, the main color decoder 710 directly decodes CH (for a non-flat-block, as determined in step 1910). Otherwise, the main color decoder 710 sets CH to zero.

In step 1914, the main color decoder 710 outputs the decoded color information generated according to the above-described approach.

B. 2. Color Index Encoding and Decoding

Recall that the color index information in a DXTn block comprises 32 bits of index information for respective pixels associated with the block. Different techniques can be used to implement the color index encoder 614 of FIG. 6. Different complementary techniques can be used to implement the color index decoder 712 of FIG. 7. Several representative techniques are described below.

Lempel-Ziv

Figure 20:
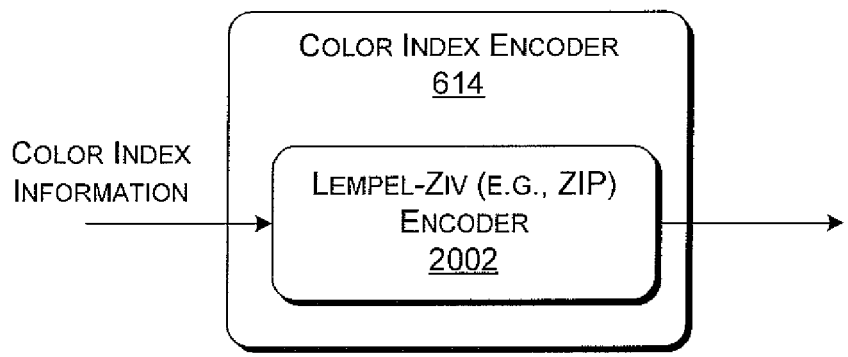
FIGS. 20-23 show different exemplary implementations of a color index encoder used in the encoder of FIG. 6.
Figure 24:
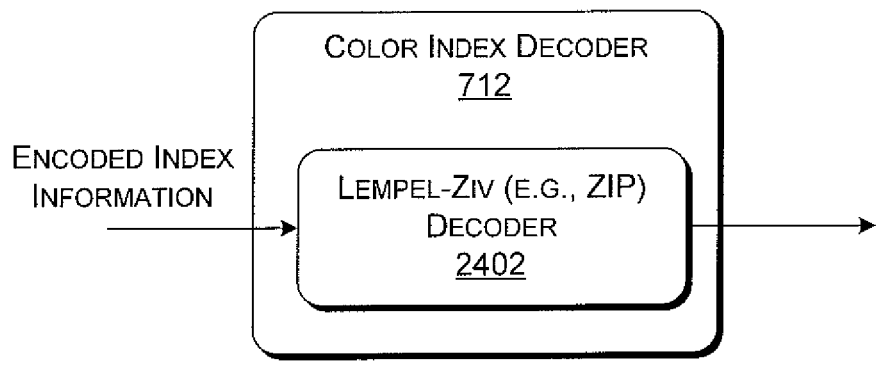
FIGS. 24-27 show different exemplary implementations of a color index decoder used in the decoder of FIG. 7.

The color index information can be compressed using Lempel-Ziv coding, e.g. as provided by ZIP coding. FIG. 20 shows the implementation of the color index encoder 614 using a Lempel-Ziv encoder 2002. FIG. 24 shows the implementation of a complementary color index decoder 712 using a Lempel-Ziv decoder 2402.

JBIG

Figure 21:
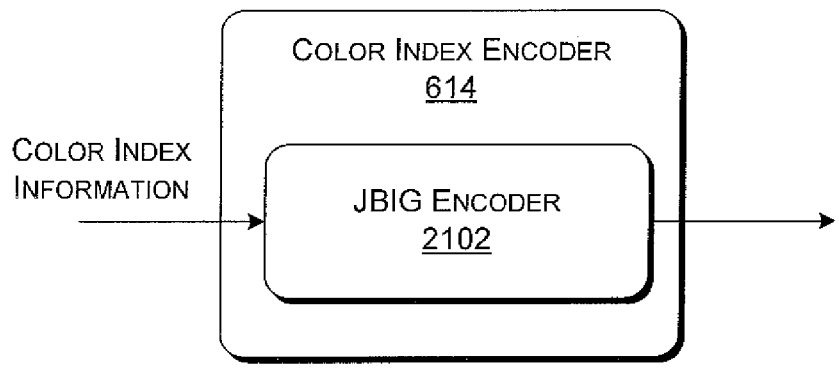
Figure 25:
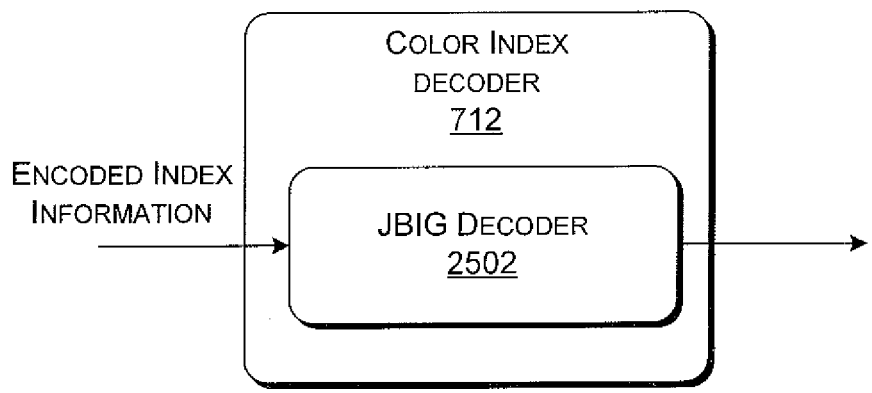

The color index information can be compressed using JBIG coding. More specifically, JBIG is a lossless compression standard for bi-level images developed by ISO/IEC JTC1/SC29/WG1. JBIG is an acronym that represents "Joint Bi-level Image Experts Group", or the entity that developed the JBIG lossless compression standard. The four-level color index image contains two bit-planes, and can be accordingly represented by two bi-level images. Then, the color index encoder 614 can use JBIG to lossless-compress the two bi-level images. FIG. 21 shows the implementation of the color index encoder 614 using a JBIG encoder 2102. FIG. 25 shows the implementation of a complementary color index decoder 710 using a JBIG decoder 2502.

Context-Based Arithmetic Encoder

Figure 22:
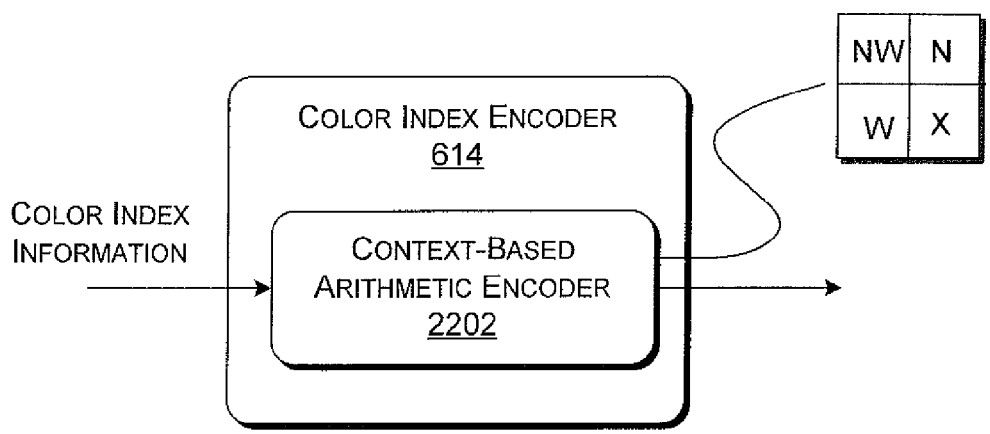
Figure 26:
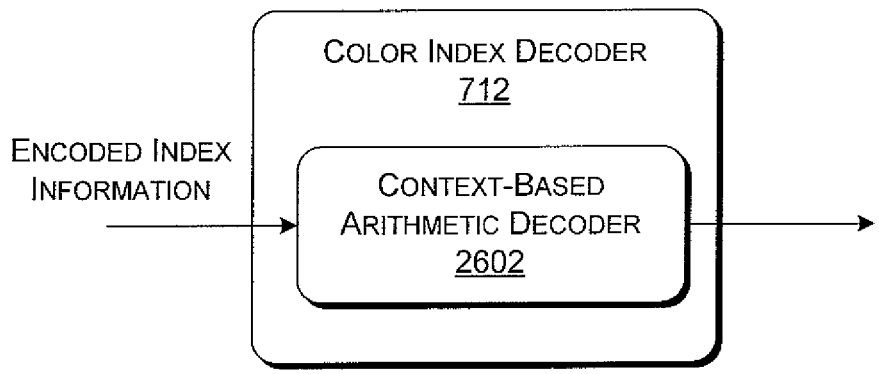

In another implementation, the color index information can be processed using a context-based arithmetic coding scheme. In this approach, the X-Encoder 406 can scan and compress the color indices in a raster scanning order, and code the current color index based on its causal neighbors to exploit the spatial relevance. For instance, assume that X denotes a current color index to be coded, and NW, N, W denote this color index's upper-left, upper, and left neighbors (as illustrated in FIG. 22). Each neighbor ranges from 0 to 3. Thus, there are a total of $4^3$=64 contexts for coding the current index X. FIG. 22 shows the implementation of the color index encoder 614 using a context-based arithmetic encoder 2202. FIG. 26 shows the implementation of a complementary color index decoder 712 using a context-based arithmetic decoder 2602.

Use of Codebook

Figure 23:
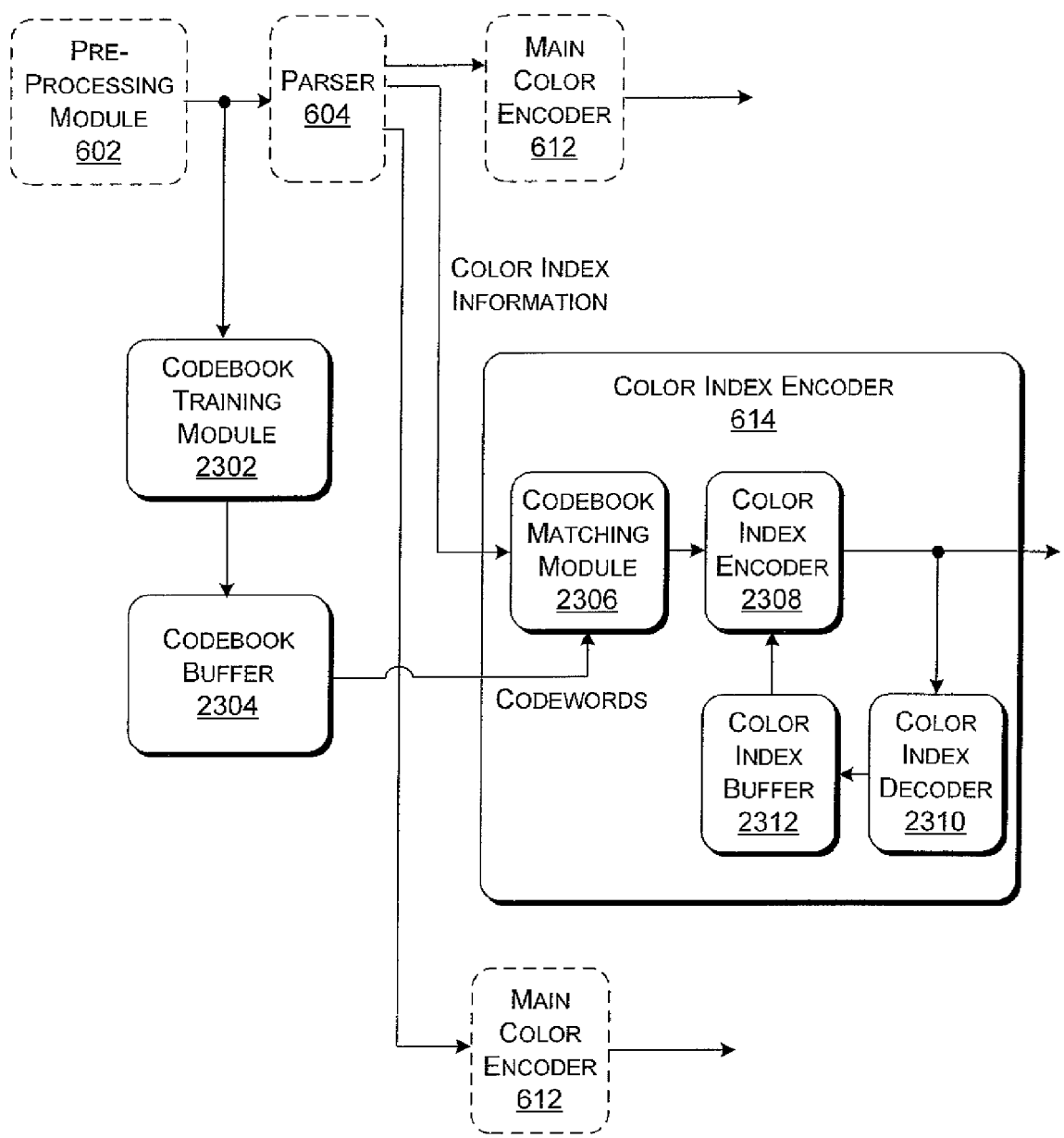

In another implementation, the color index information can be processed using vector quantization (VQ) and arithmetic coding. FIG. 23 shows one exemplary implementation of the above-described type of color index encoder 614. FIG. 23 also shows a codebook training module 2302 and a codebook buffer 2304, which serve a supportive role for the color index encoder 614. Prior to discussing the color index encoder 614, the operation of the codebook training module 3202 and the codebook buffer 2304 will be discussed.

As to the topic of codebook training, each 4×4 color index block is composed of 16 color indices, which serves as a 16-D vector. In a typical DXTn texture, some color index blocks may have the same pattern or a very similar pattern. These common color index blocks can be classified into respective groups, where each group corresponds to a fixed pattern. Other color index blocks may be unique in the sense that their patterns are not shared by other color index blocks.

In view of the above, the codebook training module 2302 examines the DXTn blocks to discover common patterns among the blocks. More specifically, for training the codebook, the codebook training module 2302 can use all of the selected color index blocks as training samples. A "selected" color index block refers to a block in which its two main colors are not identical and which does not include alpha information. The codebook training module 2302 can use any vector quantization (VQ) training algorithm to perform the training operation. In one exemplary and non-limiting implementation, the codebook training module 2302 employs the LBG algorithm proposed by Linde, Buzo, and Gray (1980) to govern the training (note Y. Linde, A. Buzo, and R. M. Gray, "An Algorithm for Vector Quantizer Design," IEEE Transactions on Communications, 1980, pp. 702-710.) In the LBG training process, the codebook training module 2302 predefines a maximum number of codewords.

As a result of the training processing, the codebook training module 2302 determines a number of codewords (associated with patterns) exhibited by the blocks in the DXTn texture information. Each codeword corresponds to a 16-D vector, where the codeword is also a color index block. Each codeword is also assigned to a label. Assuming that the number of codewords is N, the labels will range from 0 to N−1. The codebook buffer 2304 stores the results of the analysis performed by the codebook training module 2302.

Figure 27:
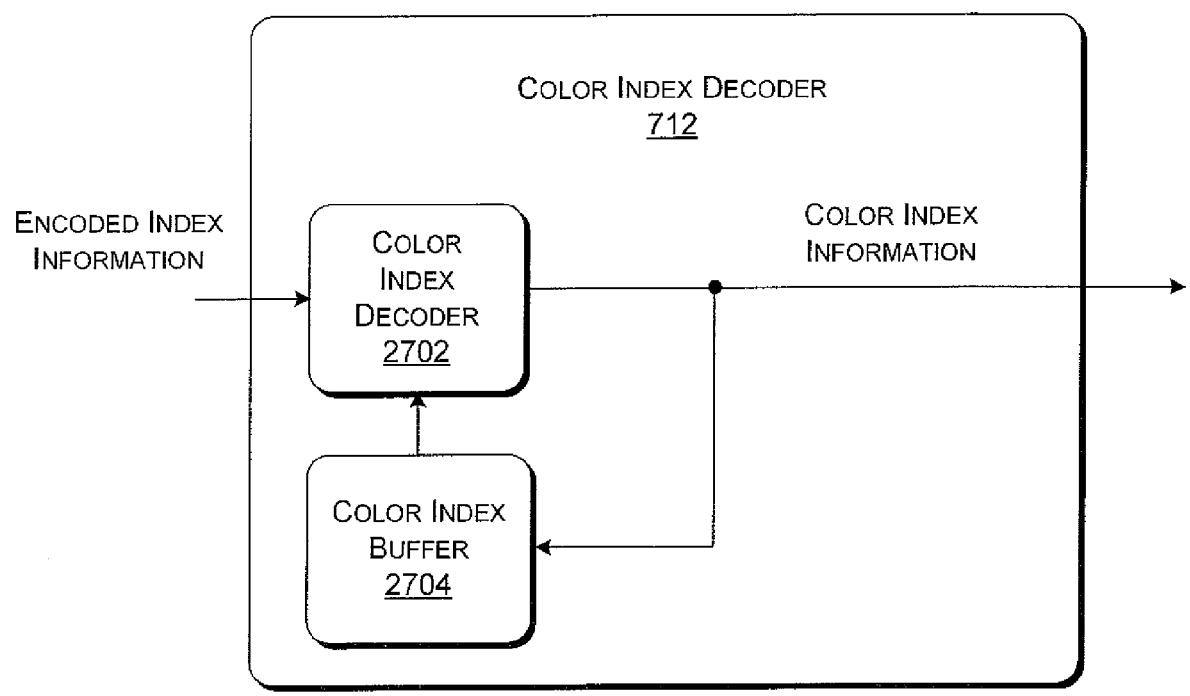

Now advancing to the color index encoder 614, this functionality includes a codebook matching module 2306. The purpose of this module 2306 is to determine whether a block under consideration has a pattern which matches a pattern in the codebook buffer 2304. If so, the color index encoder 614 can encode the label associated with the matching pattern in lieu of the pattern itself, which reduces the need to code and decode the same pattern many times. Further, if the same label has already been encoded, there is no need to encode it again. The color index encoder 2308, in conjunction with the color index decoder 2310 and color index buffer 2312, perform the role of encoding the color index information (in the manner described more fully in the context of FIG. 29 below). FIG. 27 shows the implementation of a complementary color index decoder 712, including a color index decoder 2702 and color index buffer 2704.

Figure 28:
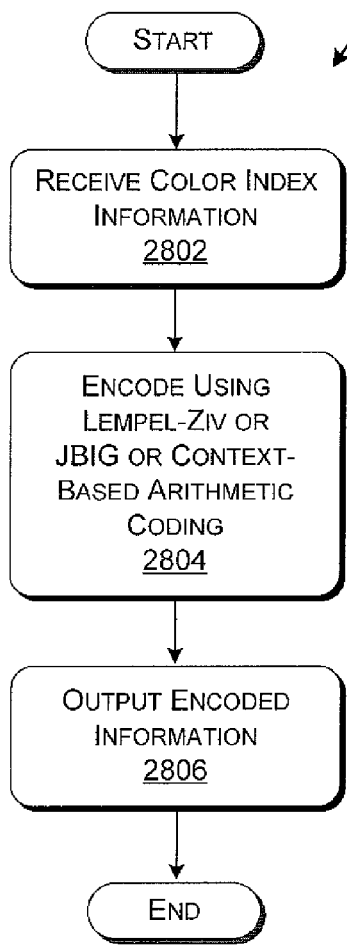
FIGS. 28 and 29 show exemplary procedures which explain a manner of operation of the color index encoders of FIGS. 20-23.

FIG. 28 shows a procedure 2800 which explains an exemplary manner of operation of the Lempel-Ziv, JBIG, and context-based arithmetic solutions of FIGS. 20-22.

In step 2802, the color index encoder 614 receives color index information.

In step 2804, the color index encoder 614 encodes color index information using either the Lempel-Ziv approach (e.g., the ZIP approach), or the JBIG approach, or the context-based arithmetic approach.

In step 2806, the color index encoder 614 outputs the encoded color index information generated according to one of the above-described approaches.

Figure 30:
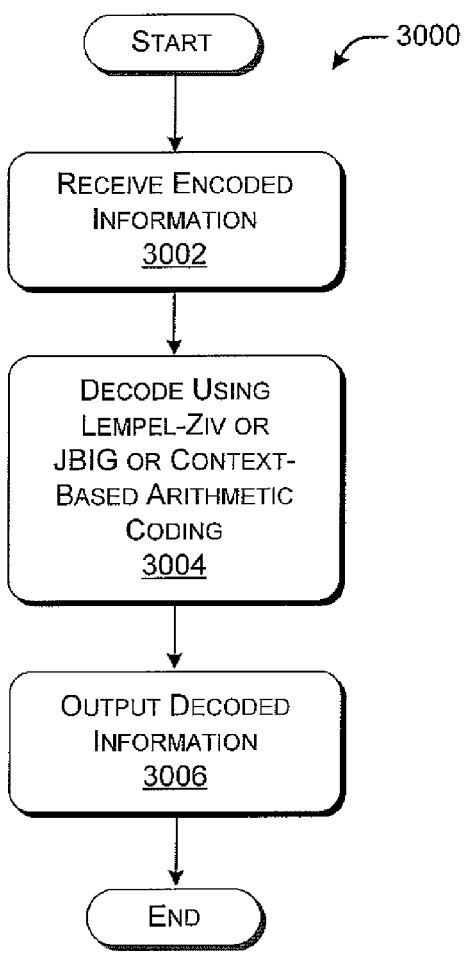
FIGS. 30 and 31 show exemplary procedures which explain a manner of operation of the color index decoders of FIGS. 24-27.

FIG. 30 shows a procedure 3000 for decoding color index information, which is complementary to the procedure 2800 of FIG. 28.

In step 3002, the color index decoder 712 receives encoded color index information.

In step 3004, the color index decoder 712 decodes the color index information using either the Lempel-Ziv approach (e.g., the ZIP approach), or the JBIG approach, or the context-based arithmetic approach, to thereby reconstruct the color index information.

In step 3006, the color index decoder 712 outputs the decoded color index information.

Figure 29:
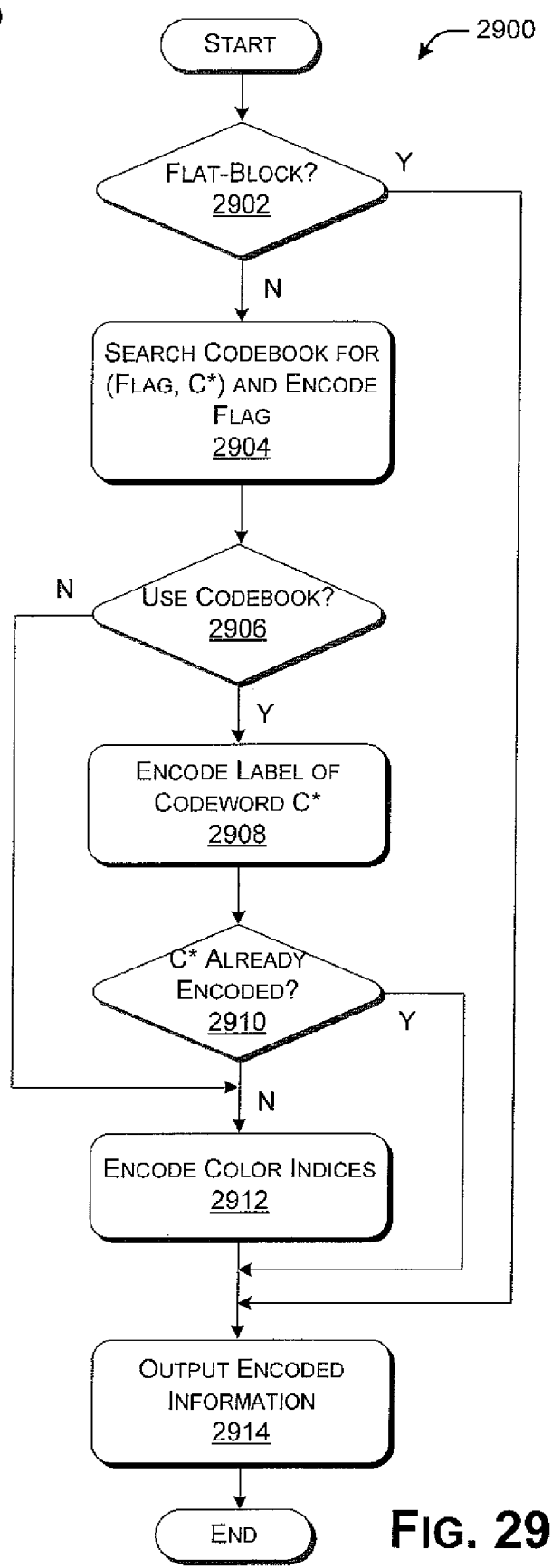

FIG. 29 shows a procedure 2900 which explains an exemplary manner of operation of the codebook encoding solution of FIG. 23.

In step 2902, the color index encoder 614 determines whether the block is a flat-block or a non-flat-block. If the block corresponds to a flat-block, it is unnecessary to code the color indices.

In step 2904, for a non-flat-block, the color index encoder 614 encodes the color indices. This is performed by searching the codebook to find a codeword that matches the current color index block. The matching criterion is also related to the main colors, and hence the actual distortion can be considered. If step 2904 successfully finds a matched codeword C*, this step sets a flag that indicates that the codebook should be used in the encoding; otherwise, this step sets the flag to indicate that the codebook should not be used in encoding. The flag itself is encoded using an arithmetic coder.

Step 2906 is a branching operation based on whether or not the codebook is being used.

In step 2912, if the codebook is not being used, each index in the 4×4 color index block is encoded using the above-described type of context-based arithmetic coder, with its upper, left, and upper-left neighbor indices as the contexts.

In step 2908, if the codebook is being used, the label that codeword C* corresponds to is encoded with the arithmetic coder. Moreover, if the codeword C* is used for the first time (as determined in step 2910), its corresponding color indices are also encoded with the same method set forth above for step 2912.

In step 2914, the color index encoder 614 outputs the encoded color index information generated according to the above-described codebook approach.

Figure 31:
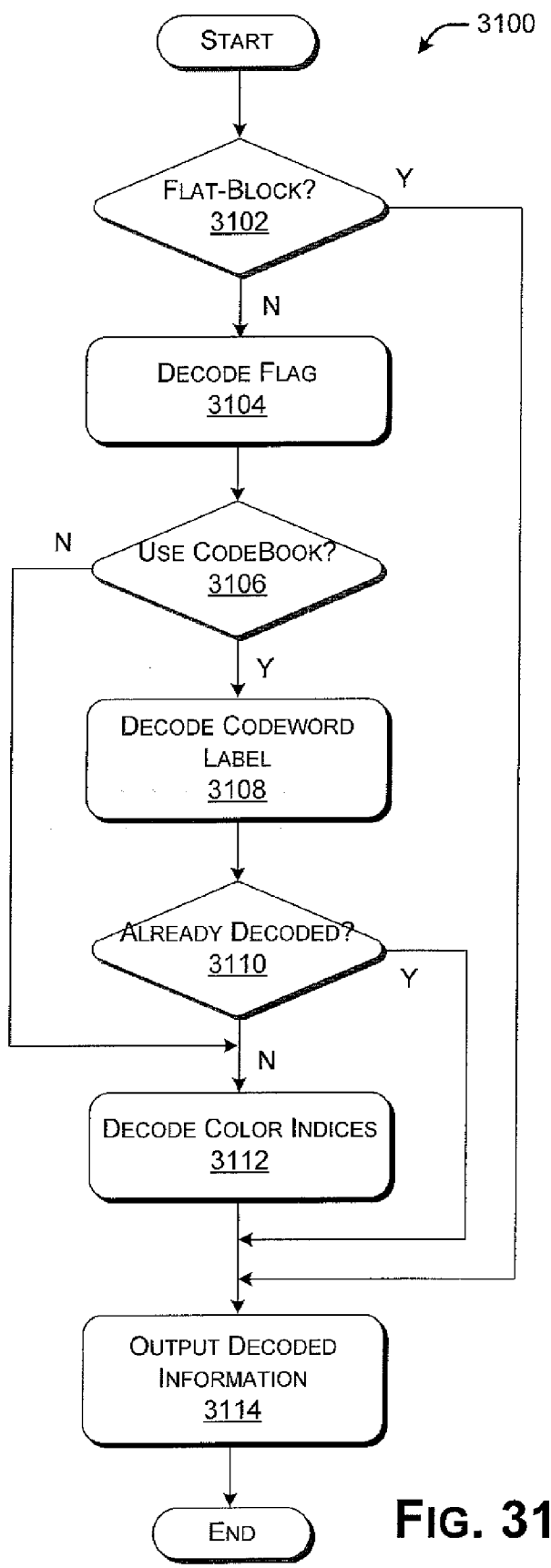

FIG. 31 shows a procedure 3100 for decoding color index information, which is complementary to the procedure 2900 of FIG. 29.

In step 3102, the color index decoder 712 determines whether the block is a flat-block or a non-flat-block. If the block corresponds to a flat-block, it is unnecessary to decode the color indices. That is, if the block is a flat-block, a default value is used to reconstruct the color indices. Otherwise, the color index block is decoded in the following manner.

In step 3104, the flag which indicates whether or not to use the codebook is decoded.

Step 3106 is a branch operation based on whether or not the codebook is being used.

In step 3112, if the codebook is not being used, the color indices are directly decoded using the arithmetic decoder.

In step 3108, if the codebook is being used, the label of the codeword is decoded, and the corresponding codeword is further decoded if it emerges for the first time (as determined by step 3110).

In step 3114, the color index decoder 712 outputs the decoded color index information.

B.3. DXT3 Alpha Index Encoding and Decoding

Recall that a DXT3 texture block contains a 4×4 DXT3 alpha index block, two main colors and a 4×4 color index block. Different techniques can be used to implement the alpha index encoder 618 (in the context of its processing of DXT3 texture information). Different complementary techniques can be used to implement the alpha index decoder 716 of FIG. 7. Several representative techniques are described below.

Lempel-Ziv

Figure 32:
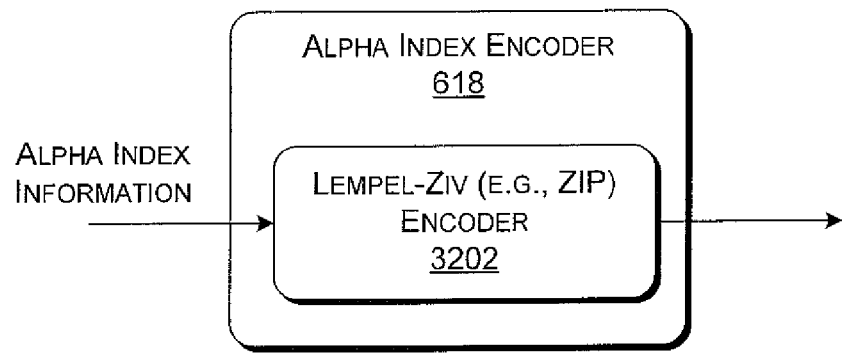
FIGS. 32-35 show different exemplary implementations of a DXT3 alpha index encoder used in the encoder of FIG. 6.
Figure 36:
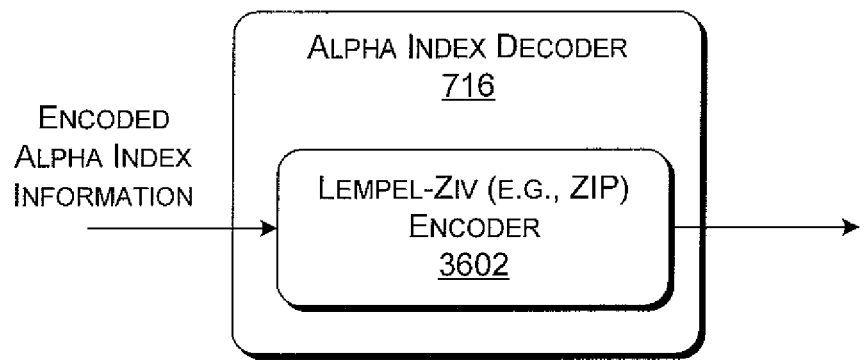
FIGS. 36-39 show different exemplary implementations of a DXT3 alpha index decoder used in the decoder of FIG. 7.

The DXT3 color information can be compressed using Lempel-Ziv coding, e.g., as provided by ZIP coding. FIG. 32 shows the implementation of the alpha index encoder 618 using a Lempel-Ziv encoder 3202. FIG. 36 shows the implementation of a complementary alpha index decoder 716 using a Lempel-Ziv decoder 3602.

JPEG-LS

Figure 33:
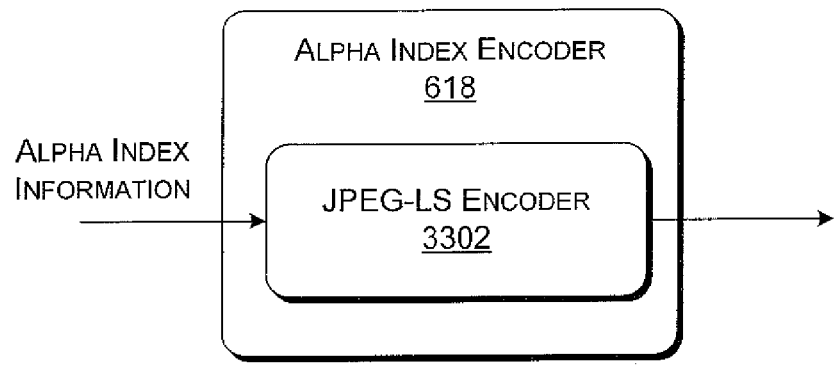
Figure 37:
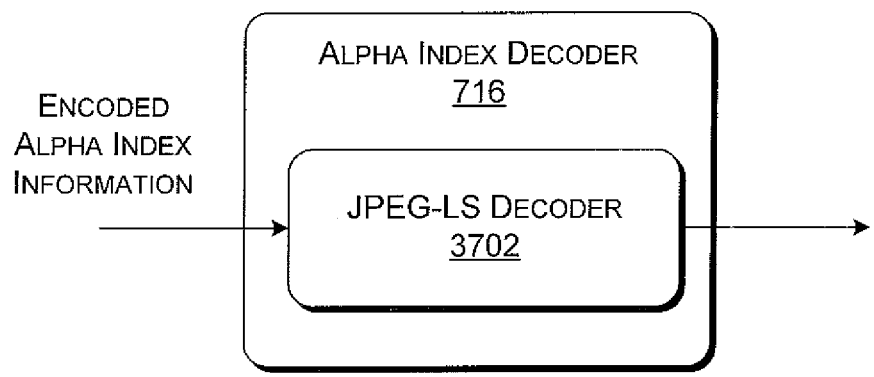

The DXT3 alpha index image can be considered as a 16-level gray image. The alpha index encoder 618 can use JPEG-LS to directly lossless-compress this alpha index information. FIG. 33 shows the implementation of the alpha index encoder 618 using a JPEG-LS encoder 3302. FIG. 37 shows the implementation of a complementary color index decoder 716 using a JPEG-LS decoder 3702.

Predictive Coding

Figure 34:
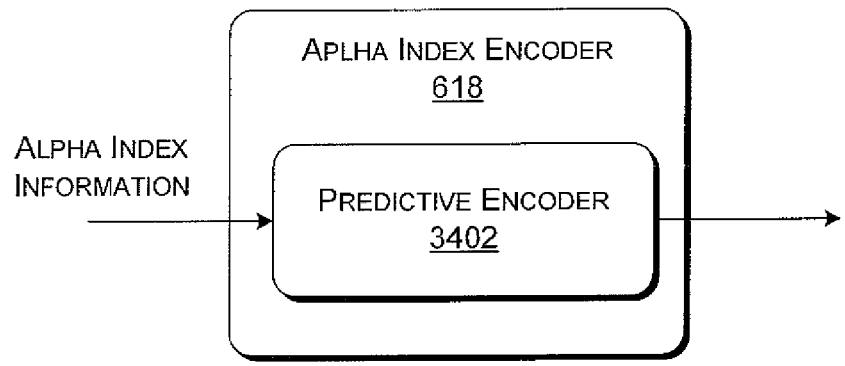
Figure 38:
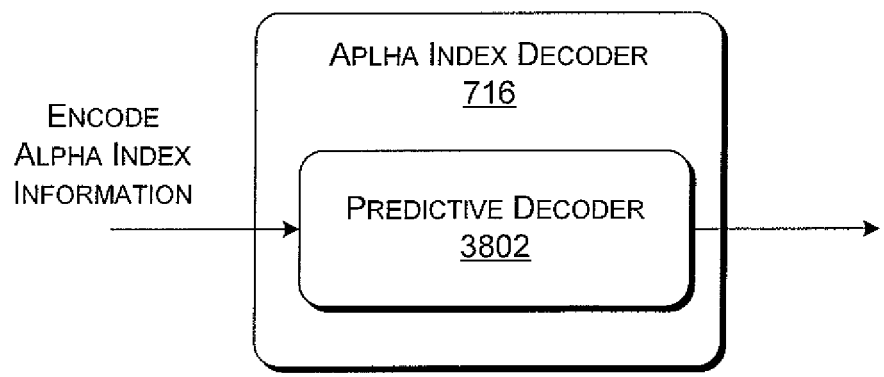

A predictive coding solution can be used to code the DXT3 alpha index information. In this solution, the alpha indices are scanned in a raster scanning order. Then, the alpha index encoder 618 predictive-codes the current color index based on its causal neighbors. More specifically, the prediction is from the current color index's left or upper neighbor. The alpha index encoder 618 codes the prediction direction and residue (in terms of the current pixel) with a context-based arithmetic coder. The contexts are also taken from the current color index's three neighbors, as shown in FIG. 22. It should be noted that the residue ranges from −15 to 15. In particular, the alpha index encoder 618 separately encodes the sign and the magnitude of the residue. For the arithmetic coding of the sign, there are a total of 2³=8 contexts. For the arithmetic coding of magnitude, there are a total of 4³=64 contexts. FIG. 34 shows the implementation of the alpha index encoder 618 using a predictive encoder 3402. FIG. 38 shows the implementation of a complementary color index decoder 716 using a predictive decoder 3802.

Figure 35:
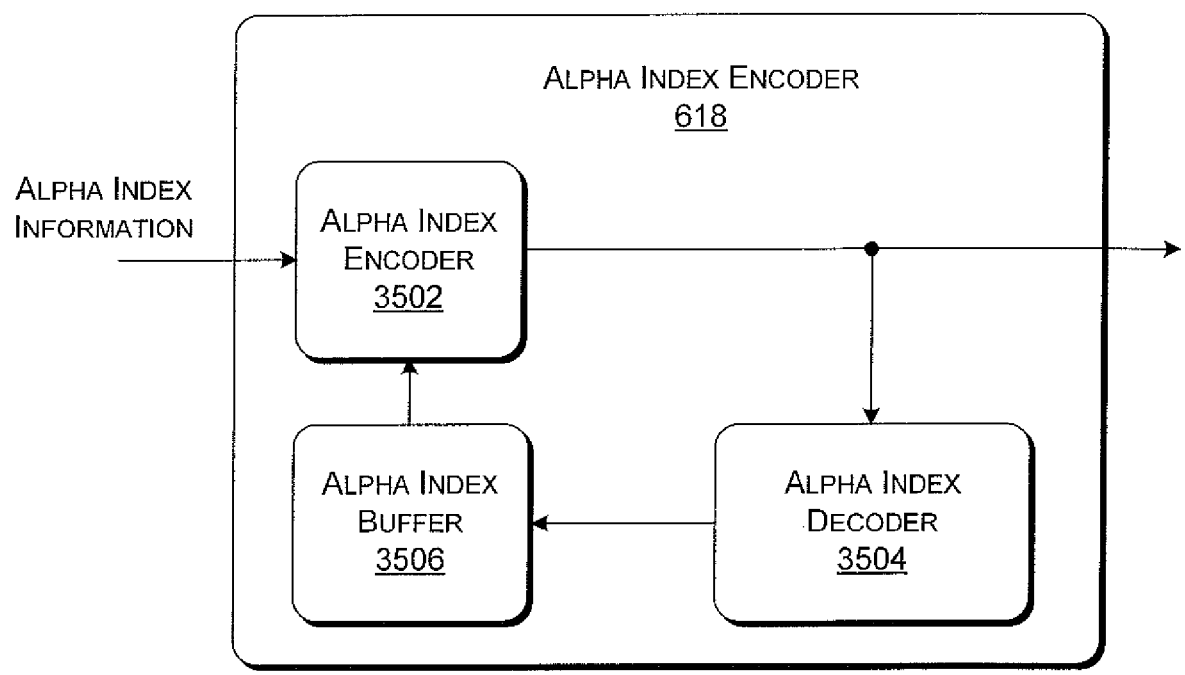
Figure 39:
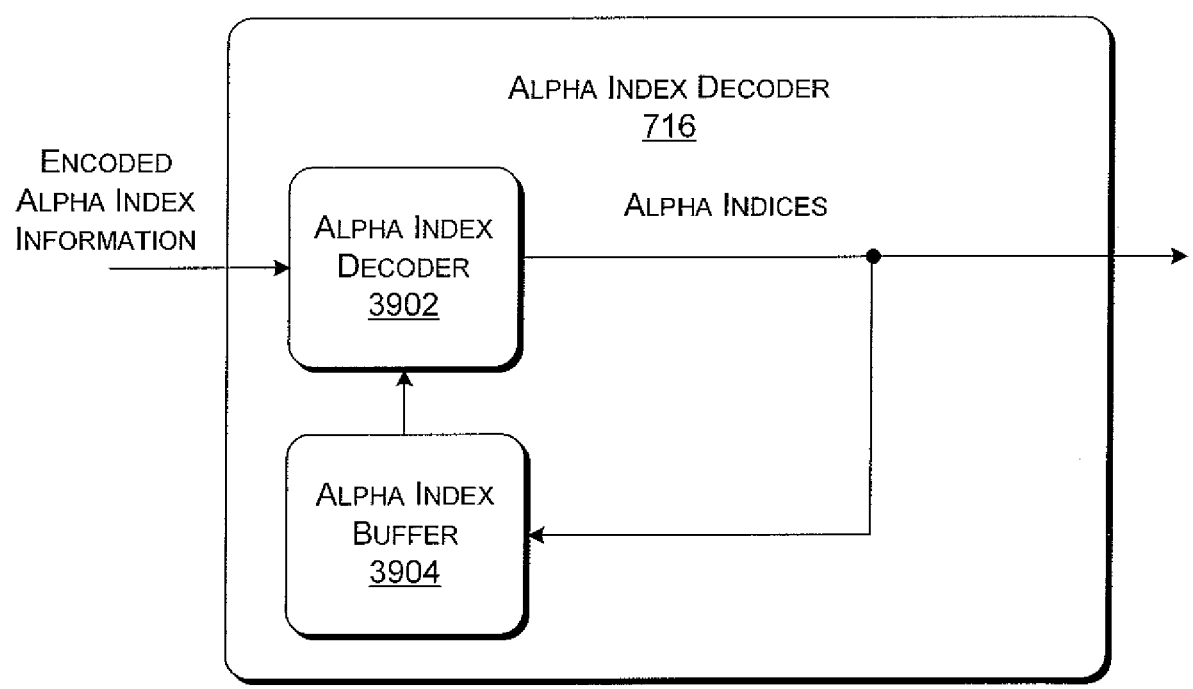

FIG. 35 shows another solution for encoding alpha index information, including an alpha index encoder 3502, an alpha index decoder 3504, and an alpha index buffer 3506. The alpha index encoder 3502 can use a form of predictive coding, the operation of which is set forth more fully in the context of FIG. 41 below. FIG. 39 shows the implementation of a complementary alpha index decoder 716, including an alpha index decoder 3902 and an alpha index buffer 3904, the operation of which is set forth more fully in the context of FIG. 43 below.

Figures 40, 41:
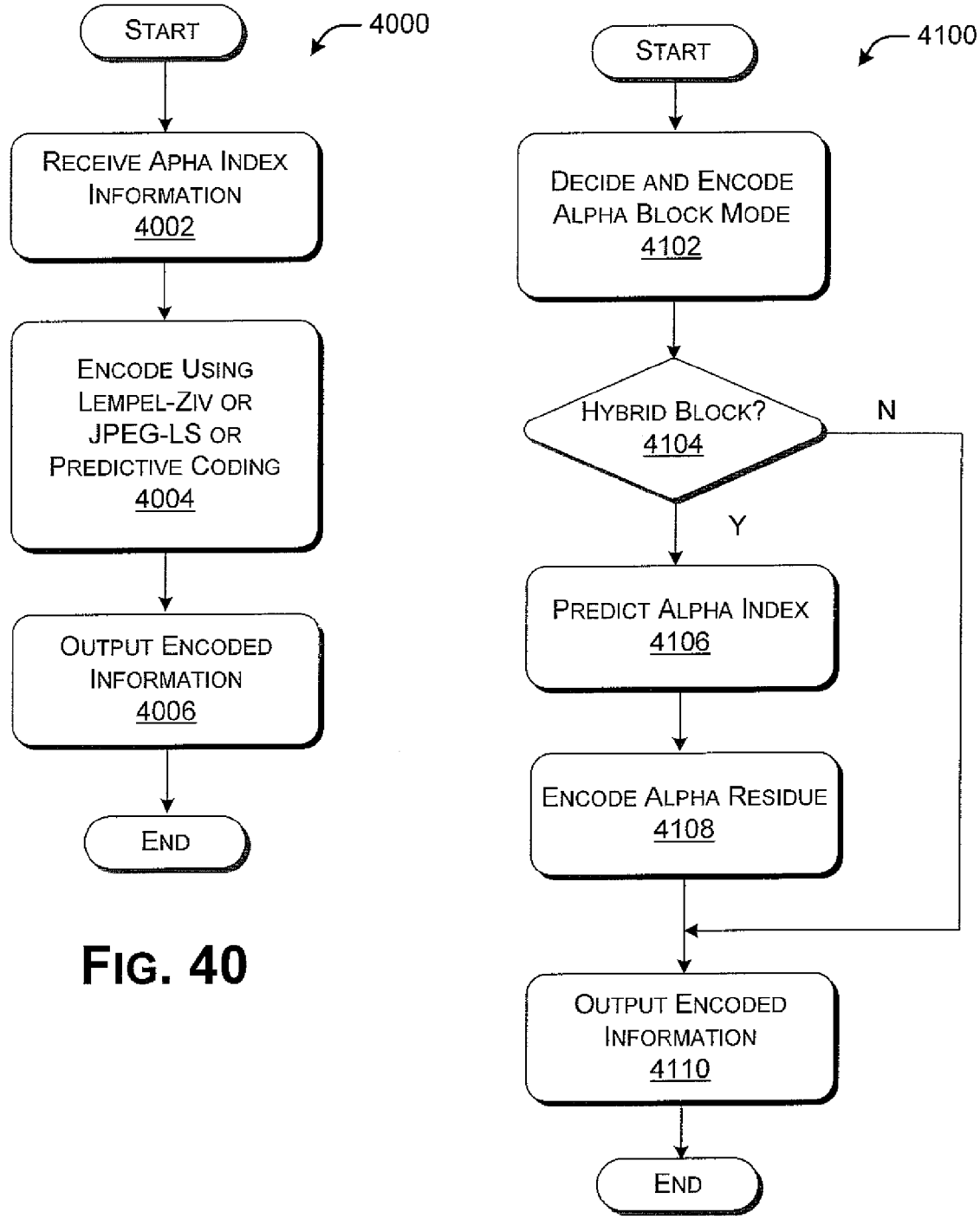
FIGS. 40 and 41 show exemplary procedures which explain a manner of operation of the alpha index encoders of FIGS. 32-35.

FIG. 40 shows a procedure 4000 which explains an exemplary manner of encoding for DXT3 alpha index information, using the Lempel-Ziv, JPEG-LS, and predictive coding solutions of FIGS. 32-34.

In step 4002, the alpha index encoder 618 receives alpha index information.

In step 4004, the alpha index encoder 618 encodes alpha index information using either the Lempel-Ziv approach (e.g., the ZIP approach), or the JPEG-LS approach, or the predictive coding approach.

In step 4006, the alpha index decoder 618 outputs the encoded alpha index information generated according to one of the above-described approaches.

Figure 42:
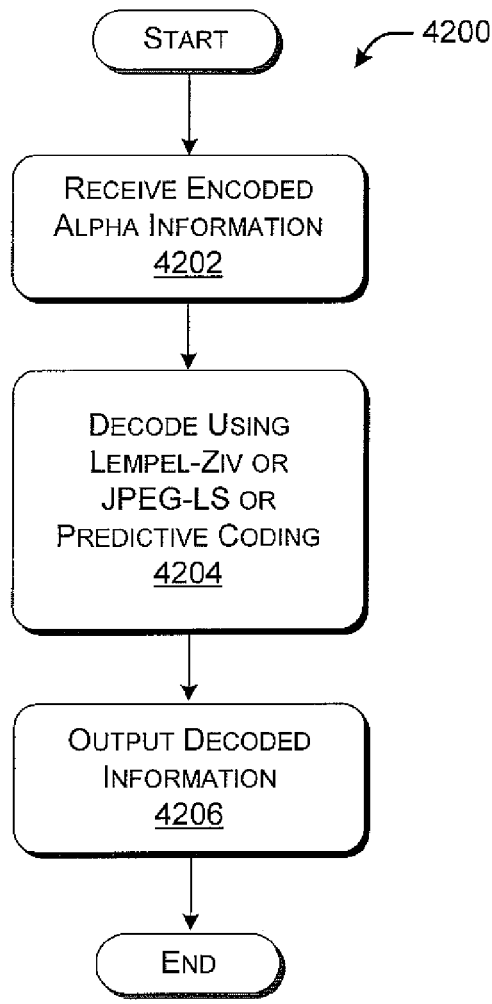
FIGS. 42 and 43 show exemplary procedures which explain a manner of operation of the alpha index decoders of FIGS. 36-39.

FIG. 42 shows a procedure 4200 for decoding alpha index information for DXT3, which is complementary to the procedure 4000 of FIG. 40.

In step 4202, the alpha index decoder 716 receives encoded alpha index information.

In step 4204, the alpha index decoder 716 decodes the alpha index information using either the Lempel-Ziv approach (e.g., the ZIP approach), or the JPEG-LS approach, or the predictive coding approach, to thereby reconstruct the alpha index information.

In step 4206, the alpha index decoder 716 outputs the decoded alpha index information.

FIG. 41 shows a procedure 4100 which explains an exemplary manner of operation of the DXT3 alpha index encoding solution of FIG. 35.

In step 4102, the alpha index encoder 618 determines the mode of the current alpha index block as one of: transparent; opaque; and hybrid. A transparent block reflects a block that only contains transparent pixels. An opaque block reflects a block that only contains opaque pixels. And a hybrid block reflects a block that contains both transparent and opaque pixels. Then, the alpha index encoder 618 encodes the determined block mode using an arithmetic coder.

Step 4104 determines whether a hybrid block is present. For transparent and opaque blocks, it is unnecessary to encode the alpha indices, as indicated by the "N" branch of step 4104.

In step 4106, if a hybrid block is present, each alpha index is predictive-coded. The prediction is achieved from the upper or left alpha index. Given the current alpha index (denoted as A), and its tipper, left and upper-left neighbors (denoted as uA, lA and u1A, respectively), a prediction value refA can be obtained as follows:

if (ulA >= lA && ulA >= uA)
    refA = min(lA, uA);
else if (ulA <= lA && ulA <= uA)
    refA = max(lA, uA);
else
    refA = uA + lA − ulA.

After obtaining the prediction, in step 4108, the alpha index encoder 618 calculates the residue and encodes it using a context-based arithmetic coder.

In step 4110, the alpha index encoder 618 outputs the encoded alpha index information.

Figure 43:
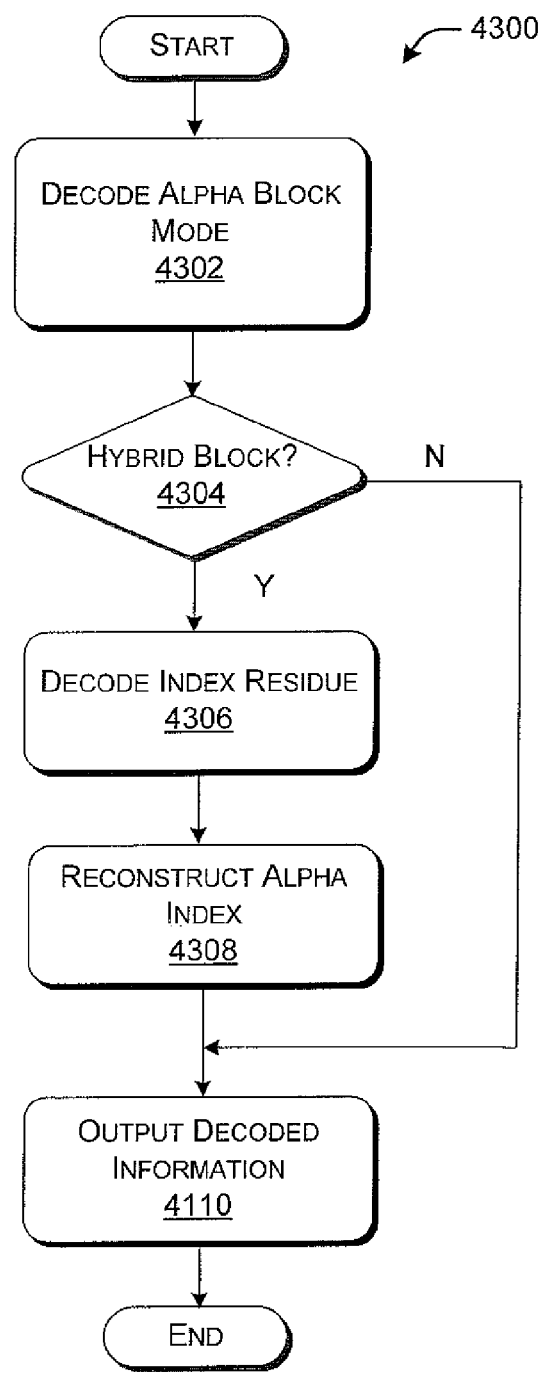
Figure 44:
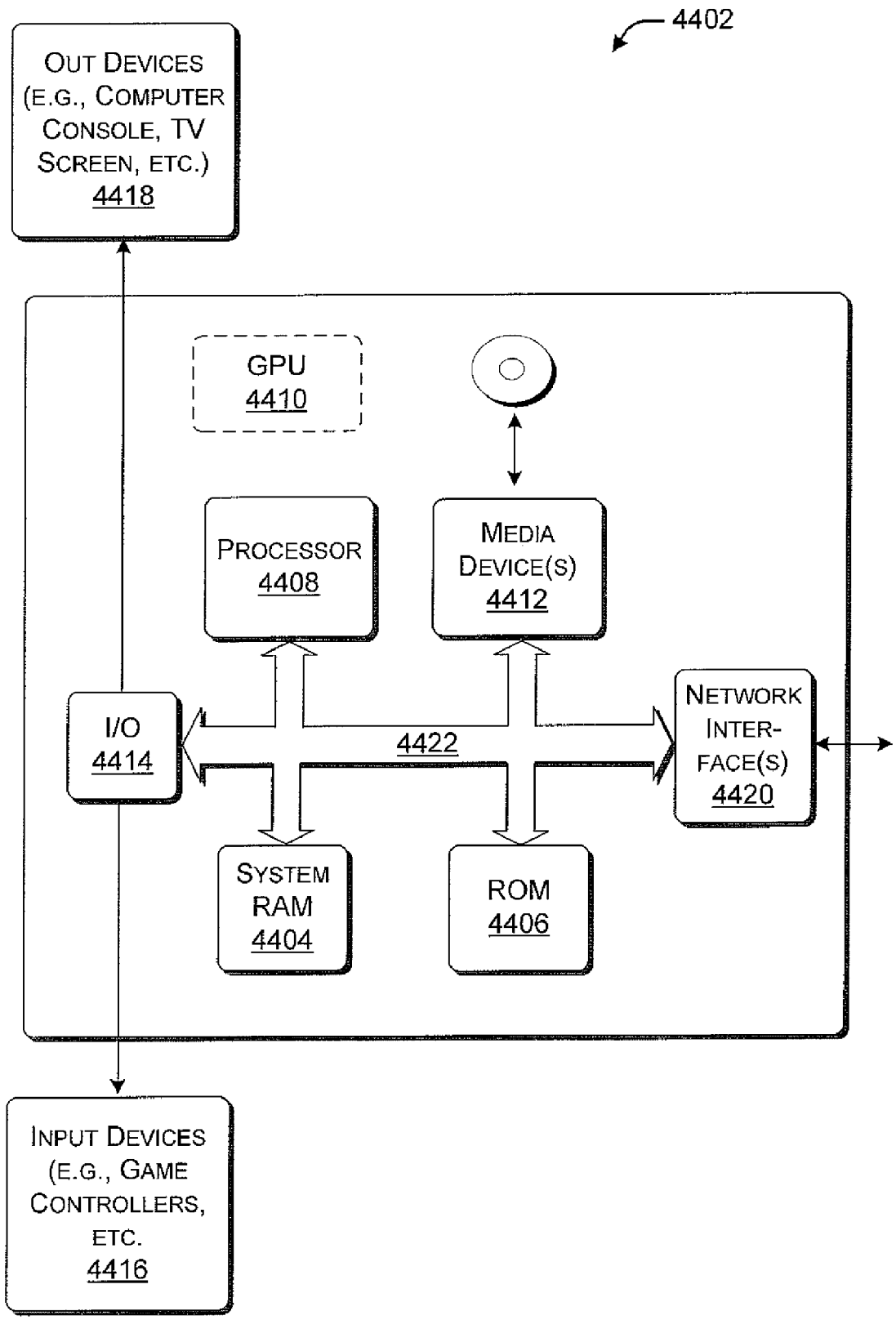
FIG. 44 shows a processing environment in which the compression technique can be applied.

FIG. 43 shows a procedure 4300 for decoding alpha index information for DXT3, which is complementary to the procedure 4100 of FIG. 41.

In step 4302, the alpha index decoder 716 decodes the alpha block mode (described above). If the mode is transparent or opaque, the alpha index decoder 716 accordingly sets the reconstructed alpha indices as transparent or opaque.

For the hybrid block (as detected in step 4304), the alpha index decoder 716 decodes the alpha indices one-by-one using the arithmetic decoder. More specifically, in step 4306, for each alpha index, the alpha index decoder 716 first decodes the residue alpha index. Since the upper, left and upper-left neighbors of the current alpha index have been reconstructed, the alpha index decoder 716 can obtain the prediction of the current alpha index with the same method used for the DXT3 alpha index encoding process.

In step 4038, with the prediction value and the decoded residue, the alpha index decoder 716 can reconstruct the current alpha index.

In step 4110, the alpha color index decoder 716 outputs the decoded alpha index information.

B.4. DXT5 Alpha Index and Encoding and Decoding

Recall that the DXT5 texture block contains two main alpha values, a 4×4 DXT5 alpha index block, main colors, and a 4×4 color index block. In one implementation, the DXT5 alpha index encoder 618 and decoder 716 can rely on the same techniques used for the coding (and decoding) of the color index image (described above). Thus, at least the following solutions can be applied to encode (and decode) DXT5 alpha index information: Lempel-Ziv coding; JBIG coding; and index-by-index context-based arithmetic coding, etc. Note that for transparent and opaque blocks, it is unnecessary to encode the main alpha values and alpha indices.

B.5. Main Alpha Encoding and Decoding

According to one implementation, the main alpha encoder 616 and corresponding main alpha decoder 714 can code the DXT5 main alpha images (A0 and A1) for hybrid blocks using the same solutions as the coding of main color images. Namely, the main alpha encoder 616 and corresponding main alpha decoder 714 can rely on at least: Lempel-Ziv coding; JPEG-LS coding; and predictive coding using the Haar transform, etc. For example, as to the use of predictive coding, the main alpha encoder 616 can convert the A0 and A1 values to AL and AH values using the Haar transform. Then, the main alpha encoder 616 can predictive-code AL and directly code AH, both with an arithmetic coder. Note that for transparent and opaque blocks, it is unnecessary to encode the main alpha values and alpha indices.

B.6. DXT2 and DXT4 Formats

As stated above, the DXT2 compression format is similar to DXT3, and the DXT4 compression format is similar to DXT5. Thus, DXT2 textures can be further compressed (and decompressed) using any technique (or combination of techniques) described above for DXT3. DXT4 textures can be further compressed (and decompressed) using any technique (or combination of techniques) described above for DXT5.

In conclusion to Section B, to reiterate, the modules described above can be combined together in any manner. To name a few examples: an X-Encoder for DXT1 can be constructed using the modules shown in FIGS. 6, 12, and 23; an X-Decoder for DXT1 can be constructed using the modules shown in FIGS. 7, 15, and 27; an X-Encoder for DXT3 can be constructed using the modules shown in FIGS. 6, 12, 23, and 35; an X-Decoder for DXT3 can be constructed using the modules shown in FIGS. 7, 15, 27, and 39; an X-Encoder for DXT5 can be constructed from the modules shown in FIGS. 6, 12, 23, 35, in combination with a main alpha coder that is similar to the main color coder of FIG. 12; and an X-Decoder for DXT5 can be constructed using the modules shown in FIGS. 7, 15, 27, 39, in combination with a main alpha decoder that is similar to the main color decoder of FIG. 15.

C. Exemplary Processing Environments

The coding strategies described above can be applied to many different kinds of technical environments. Exemplary technical environments include a personal computer (PC), game console, and so forth. This section sets forth a generic processing functionality 4402 that represents any kind of processing environment for implementing the coding strategies.

The processing functionality 4402 can include various volatile and non-volatile memory, such as RAM 4404 and ROM 4406, as well as one or more central processing units (CPUs) 4408. The processing functionality 4402 can also optionally include one or more graphics processing units (GPUs) 4410. Image processing tasks can be shared between the CPU 4408 and GPU 4410. In the context of the present disclosure, any of the coding functions of the system 400 shown in FIG. 4 can be allocated in any manner between the CPU 4408 and the GPU 4410.

The processing functionality 4402 also optionally includes various media devices 4412, such as a hard disk module, an optical disk module, and so forth. For instance, one or more of these media devices 4412 can store the MCT texture information on a disc until it is needed. When loaded, the texture information can be stored in RAM 4404.

The processing functionality 4402 also includes an input/output module 4414 for receiving various inputs from the user (via input devices 4416), and for providing various outputs to the user (via output device 4418). The processing functionality 4402 can also include one or more network interfaces 4420 for exchanging data with other devices via one or more communication conduits (e.g., networks). One or more communication buses 4422 communicatively couple the above-described components together.

D. Exemplary Texture Information

Figure 45:
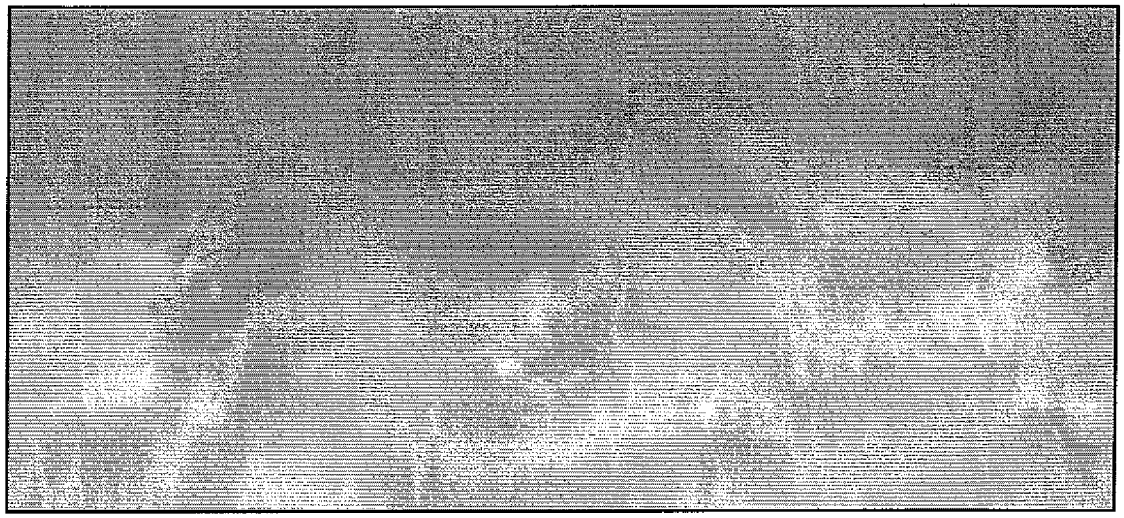
FIGS. 45-58 shows different examples of texture images associated with the compression technique.
Figure 46:
Figure 47:
Figure 48:
Figure 49:
Figure 50:
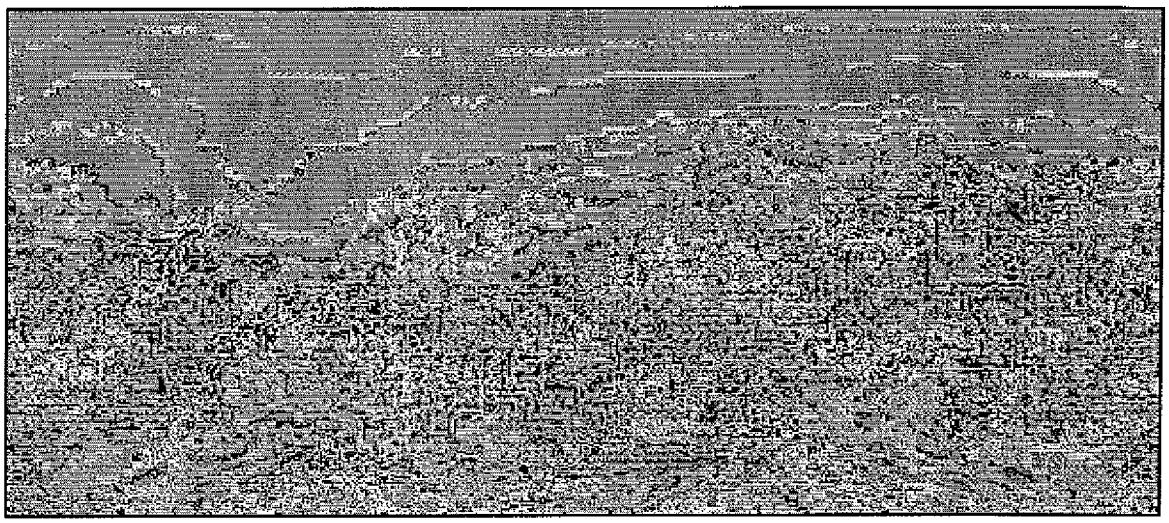
Figure 51:
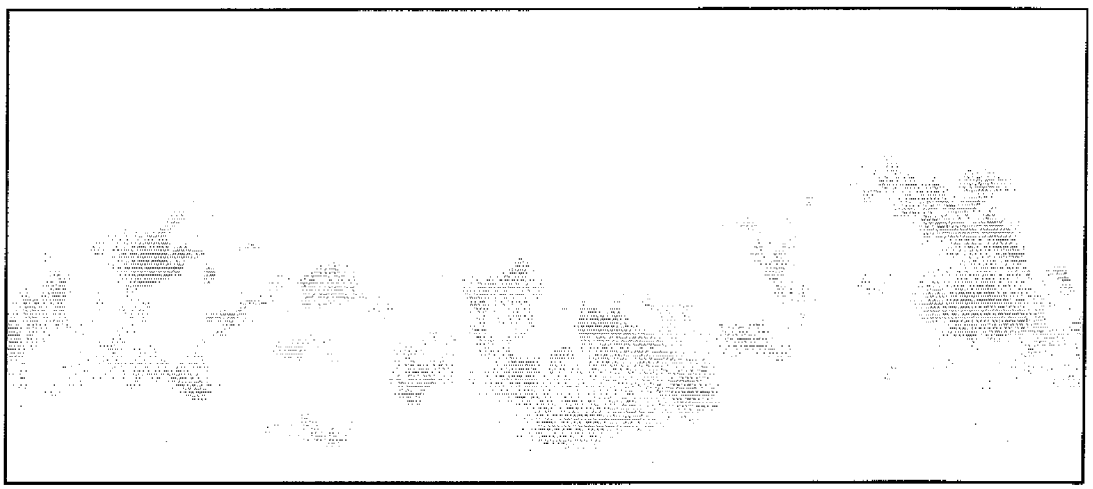
Figure 52:
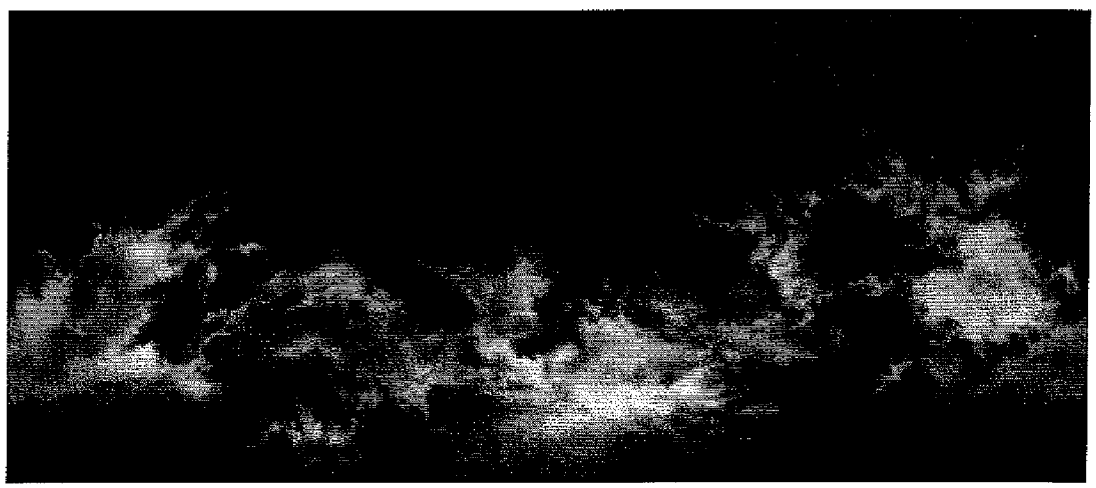
Figure 53:
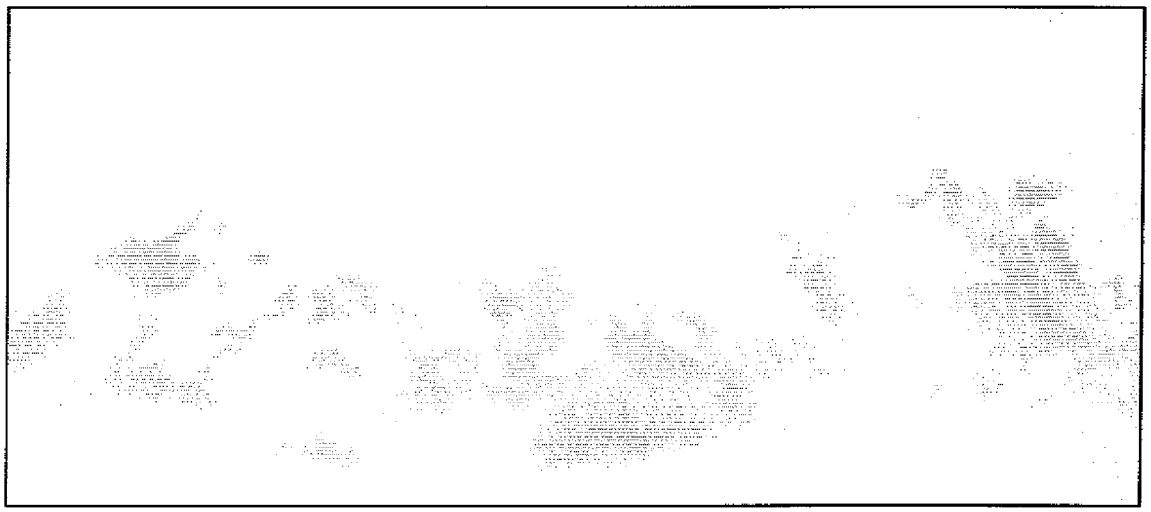
Figure 54:
Figure 55:
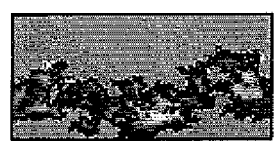
Figure 56:
Figure 57:
Figure 58:
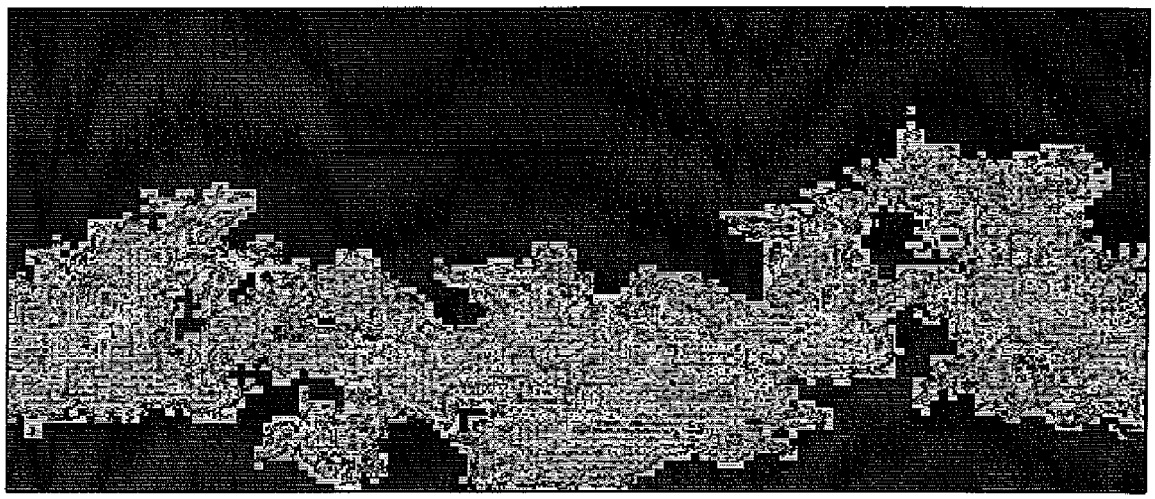

This remaining section presents examples of various texture components. Namely:

FIG. 45 shows a whole reconstructed DXT1 texture image;

FIG. 46 shows an image of a C0 component of the DXT1 texture of FIG. 45;

FIG. 47 shows an image of a C1 component of the DXT1 texture of FIG. 45;

FIG. 48 shows a CL image produced by Haar transform, based on the DXT1 texture of FIG. 45;

FIG. 49 shows a CH image produced by Haar transform, based on the DXT1 texture of FIG. 45;

FIG. 50 shows an image of a color index component of the DXT1 texture of FIG. 45;

FIG. 51 shows a whole reconstructed DXT3 texture image;

FIG. 52 shows an image of an alpha index component of the DXT3 texture image of FIG. 51;

FIG. 53 shows a whole reconstructed DXT5 texture image;

FIG. 54 shows an image of an A0 component of the DXT5 texture of FIG. 53;

FIG. 55 shows an image of an A1 component of the DXT5 texture of FIG. 53;

FIG. 56 shows an AL image produced by Haar transform, based on the DXT5 texture of FIG. 53;

FIG. 57 shows an AH image produced by Haar transform, based on the DXT5 texture of FIG. 53; and FIG. 58 shows an image of an alpha index component of the DXT5 texture of FIG. 53.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-readable storage medium for storing computer-executable instructions, that when executed, cause one or more processors to perform acts to encode by compressing textures for use in a graphics application, comprising:

converting texture information into first-compressed texture information using a first codec;

parsing the first-compressed texture information into respective components of the first-compressed texture information; and further compressing the respective components of the first-compressed texture information to yield second-compressed texture information using the first codec or a second codec, wherein the respective components include at least one of a main color information component, a color index information component, a main alpha component, or an alpha index information component.

2. The computer-readable storage medium of claim 1, wherein the first-compressed texture information is compressed using fixed length coding.

3. The computer-readable storage medium of claim 1, wherein the first-compressed texture information is compressed using S3 Texture Compression (S3TC).

4. The computer-readable storage medium of claim 1, wherein the respective components are further compressed using at least one lossless coding technique.

5. The computer-readable storage medium of claim 1, wherein the main color component is further compressed using at least one of:
Lempel-Ziv encoding;
JPEG-LS encoding; or
predictive coding, involving the use of a Haar transform.

6. The computer-readable storage medium of claim 1, wherein the color index component is further compressed using at least one of:
Lempel-Ziv encoding;
JBIG encoding; or
context-based arithmetic encoding.

7. The computer-readable storage medium of claim 1, wherein the main alpha component is further compressed using at least one of:
Lempel-Ziv encoding;
JPEG-LS encoding; or
predictive coding, involving the use of a Haar transform.

8. The computer-readable storage medium of claim 1, wherein the alpha index component is further compressed using at least one of:
Lempel-Ziv encoding;
JPEG-LS encoding;
context-based arithmetic encoding; or
predictive coding.

9. The computer-readable storage medium of claim 1, further comprising computer-executable instructions for storing the second-compressed texture information in the computer-readable medium.

10. The computer-readable storage medium of claim 1, wherein further compressing the respective components includes multiplexing compression outputs of the respective components.

11. A computer-readable storage medium for storing computer-executable instructions, that when executed, cause one or more processors to perform acts to decode textures that have been successively compressed, comprising:
demultiplexing second-compressed texture information to yield respective components of the second-compressed texture information; and
decoding the respective components to yield first-compressed texture information,
wherein the respective components include at least one of a main color information component, a color index information component, a main alpha component, or an alpha index information component.

12. The computer-readable storage medium of claim 11, wherein the first-compressed texture information is compressed using S3 Texture Compression (S3TC).

13. The computer-readable storage medium of claim 11, wherein the respective components are decoded using at least one lossless coding technique.

14. The computer-readable storage medium of claim 11, further comprising computer-executable instructions for converting the first-compressed texture information into raw texture information.

15. The computer-readable storage medium of claim 11, further comprising computer-executable instructions for providing the first-compressed texture information to a graphics application.

16. A computer-readable storage medium for storing computer-executable instructions, that when executed, cause one or more processors to perform compression and decompression of textures for use in a graphics application, comprising:
parsing first-compressed texture information into respective components of the first-compressed texture information; and
further compressing the respective components to yield second-compressed texture information;
storing the second-compressed texture information;
retrieving the stored second-compressed texture information;
demultiplexing the retrieved second-compressed texture information to yield respective components of the second-compressed texture information;
decoding the respective components to yield the first-compressed texture information.

17. The computer-readable storage medium of claim 16, further comprising computer-executable instructions for providing the first-compressed texture information to the graphics application.

18. The computer-readable storage medium of claim 16, wherein the respective components includes at least one of a main color information component, a color index information component, a main alpha component, and an alpha index information component.

* * * * *